US009048960B2

(12) United States Patent
Li et al.

(10) Patent No.: US 9,048,960 B2
(45) Date of Patent: Jun. 2, 2015

(54) METHODS AND APPARATUS FOR COMMUNICATING SAFETY MESSAGE INFORMATION

(75) Inventors: Junyi Li, Chester, NJ (US); Xinzhou Wu, Hillsborough, NJ (US); Sundar Subramanian, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 13/588,869

(22) Filed: Aug. 17, 2012

(65) Prior Publication Data

US 2014/0051346 A1 Feb. 20, 2014

(51) Int. Cl.
*H04B 7/00* (2006.01)
*H04H 20/59* (2008.01)
*H04W 4/04* (2009.01)

(52) U.S. Cl.
CPC .............. *H04H 20/59* (2013.01); *H04W 4/046* (2013.01)

(58) Field of Classification Search
CPC ...... G07C 5/008; G07C 2205/02; G08G 1/20; G08G 1/0104; G08G 1/163; G08G 1/162; G01C 21/26; G08C 17/02; G08C 2201/93; H04M 1/6091; H04W 4/04; H04W 4/046; H04W 4/20; H04L 63/0861; H04L 67/12; B60W 40/04; G01S 5/0072; Y10S 367/909
USPC ........... 455/456.3, 344, 345, 352, 67.11, 450, 455/41.1–41.3, 414.1, 66.1; 709/202, 301; 340/901, 903, 905, 425.5, 435, 436, 340/917, 925, 944; 701/445, 489, 301, 214, 701/70, 117, 30, 29, 33
See application file for complete search history.

(56) References Cited

U.S. PATENT DOCUMENTS

| | | | |
|---|---|---|---|
| 6,154,558 A * | 11/2000 | Hsieh ............................ | 382/103 |
| 6,337,637 B1 | 1/2002 | Kubota et al. | |
| 7,177,747 B2 | 2/2007 | Hiwatashi | |
| 8,155,883 B2 | 4/2012 | Yasuhara et al. | |
| 8,731,627 B2 * | 5/2014 | Inabathuni et al. ........ | 455/575.9 |
| 2006/0136105 A1 * | 6/2006 | Larson ............................ | 701/30 |
| 2006/0190162 A1 * | 8/2006 | Ampunan et al. ............ | 701/117 |
| 2007/0027610 A1 * | 2/2007 | Parikh et al. ................... | 701/117 |
| 2007/0139182 A1 * | 6/2007 | O'Connor et al. ............ | 340/521 |
| 2008/0288162 A1 | 11/2008 | Theimer et al. | |
| 2010/0100324 A1 | 4/2010 | Caminiti et al. | |
| 2010/0214085 A1 * | 8/2010 | Avery et al. ................... | 340/435 |
| 2011/0006914 A1 * | 1/2011 | Tsuda ............................ | 340/905 |
| 2011/0063130 A1 | 3/2011 | Ozaki et al. | |

(Continued)

OTHER PUBLICATIONS

International Search Report and Written Opinion—PCT/US2013/055116—ISA/EPO—Mar. 24, 2014.

*Primary Examiner* — Sujatha Sharma
(74) *Attorney, Agent, or Firm* — James K. O'Hare

(57) ABSTRACT

Various embodiments, relate to a communications system in which communications devices of users and communications devices of vehicular systems communicate safety messages through a cellular communications band or the DSRC (Dedicated short-range communications) vehicular communications band or a combination of both. Various methods and apparatus are directed to communicating safety messages between vehicles and pedestrians/cyclists through the use of a cell phone, thus improving the impact of vehicular communications. In some embodiments, at least some cell phones in a communications system includes both a DSRC communications capability and a cellular communications capability.

30 Claims, 13 Drawing Sheets

(56) References Cited

U.S. PATENT DOCUMENTS

| | | |
|---|---|---|
| 2011/0090093 A1 | 4/2011 | Grimm et al. |
| 2011/0210866 A1 | 9/2011 | David et al. |
| 2011/0260884 A1 * | 10/2011 | Yi et al. .................. 340/870.02 |
| 2012/0158820 A1 | 6/2012 | Bai et al. |
| 2013/0257631 A1 * | 10/2013 | Rangarajan et al. .......... 340/901 |

* cited by examiner

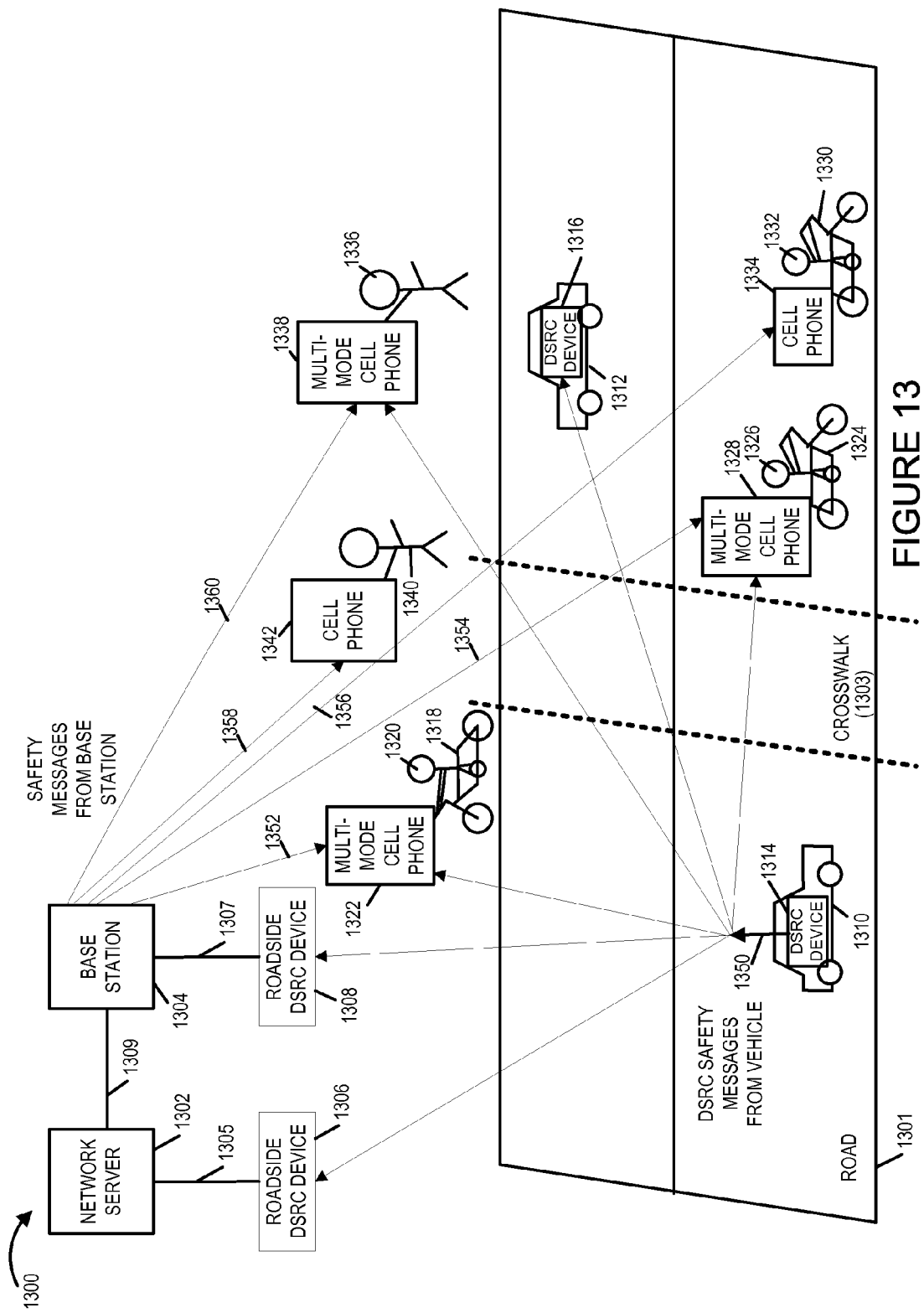

ized with a DSRC communications capability and a cellular communications capability, are embedded in a wireless enabled vehicle, e.g., a car and/or other vehicles.

METHODS AND APPARATUS FOR COMMUNICATING SAFETY MESSAGE INFORMATION

FIELD

Various embodiments are directed to communicating safety message information, and more particularly, to communicating safety message information utilizing both DSRC signaling and cellular signaling.

BACKGROUND

The IEEE Wireless Access for Vehicle Environments (WAVE) standard has been proposed for use between vehicles (V2V) and vehicles and infrastructure (V2I) over the dedicated short range communications (DSRC) radio spectrum. The vehicles and road-side units (Infrastructure) are equipped with a DSRC radio and the associated set of standards to communicate safety and non-safety related messages across the DSRC band (5.9 GHz). While the current system is designed to facilitate V2V and V2I communications, communicating the safety messages to other road users such as pedestrians and cyclists who may not have access to the DSRC devices is not well addressed in the current art. It may be advantageous for users, e.g., pedestrians and cyclists, with communications devices lacking a DSRC radio to be able to receive safety messages. Based on the above discussion there is a need for methods and apparatus to disseminate safety message information to communications devices lacking DSRC communications capability.

SUMMARY

Various embodiments, relate to a communications system in which communications devices of users and communications devices of vehicular systems communicate safety messages through a cellular communications band or the DSRC (Dedicated short-range communications) vehicular communications band or a combination of both. Various methods and apparatus are directed to communicating safety message information between vehicles and pedestrians/cyclists through the use of a cell phone, thus improving the impact of vehicular communications. In some embodiments, at least some cell phones in a communications system include both a DSRC communications capability and a cellular communications capability, e.g., some cell phones are multi-mode wireless communication devices including a DSRC communications capability and a cellular communications capability. In various embodiments, some multi-mode wireless communications devices, including a DSRC communications capability and a cellular communications capability, are embedded in a wireless enabled vehicle, e.g., a car and/or other vehicles.

An exemplary method of operating a safety system, in accordance with some embodiments, includes receiving at a server in a cellular network information obtained from dedicated short-range communications (DSRC) signals and transmitting at least some information of the received information to cellular network devices. An exemplary safety system, in accordance with some embodiments, includes: at least one processor configured to receive at a server in a cellular network information obtained from dedicated short-range communications (DSRC) signals, and transmit at least some information of said received information to cellular network devices. The exemplary safety system further includes memory coupled to said at least one processor.

An exemplary method of operating a multi-mode wireless communications device which supports cellular and DSRC communications, in accordance with some embodiments, includes receiving at least one DSRC signal and communicating information obtained from the DSRC signal to a device in the cellular network. An exemplary multi-mode wireless communications device which supports cellular and DSRC communications, in accordance with some embodiments, includes at least one processor configured to: receive at least one DSRC signal, and communicate information obtained from the DSRC signal to a device in the cellular network. The exemplary multi-mode communications device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 13 is a drawing illustrating an exemplary communications system in which DSRC safety messages are communicated and safety messages from a base station are communicated in accordance with an exemplary embodiment.

DETAILED DESCRIPTION

Figure 1:
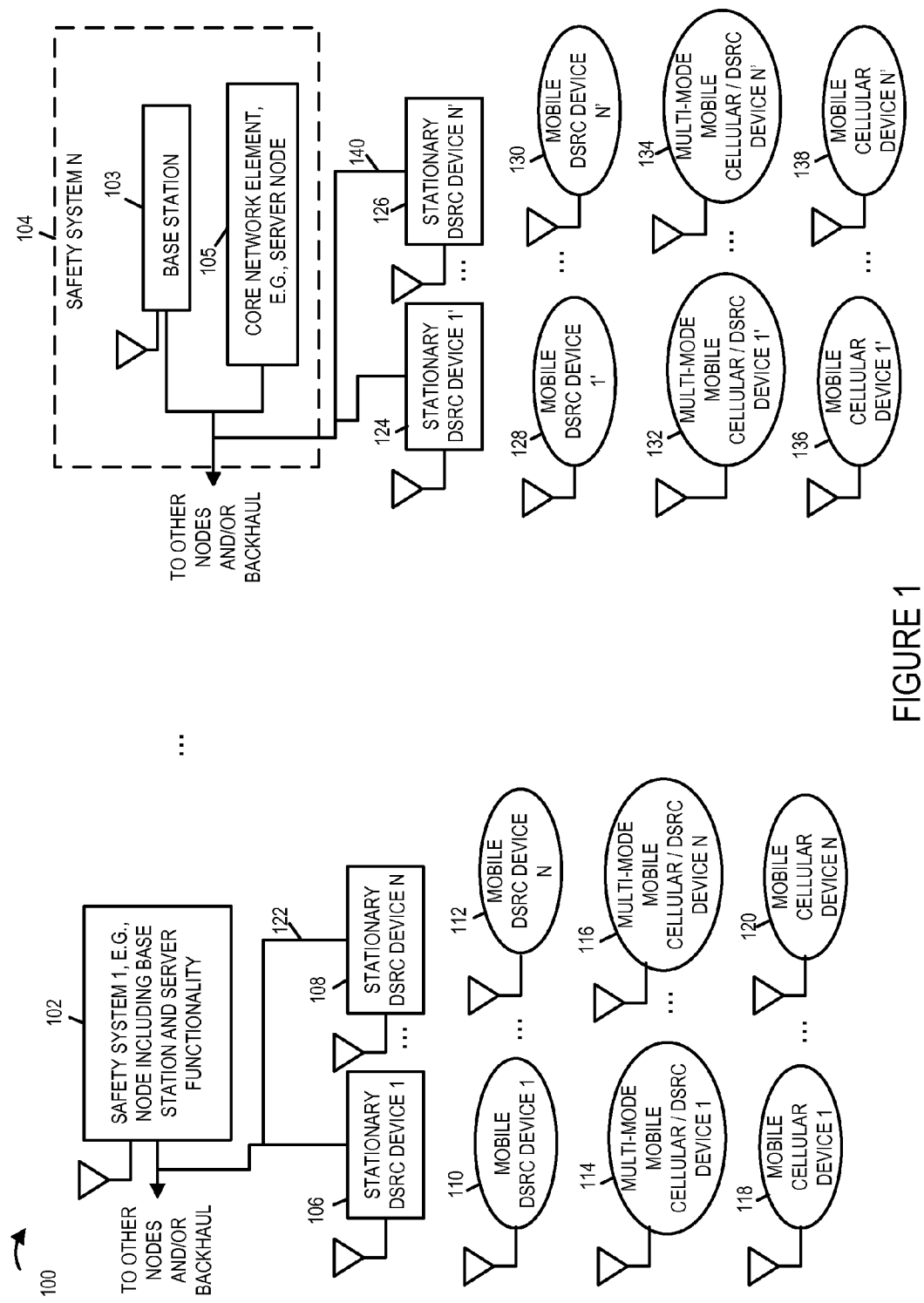
FIG. 1 is a drawing of an exemplary communications system supporting cellular and DSRC communications in accordance with an exemplary embodiment.

FIG. 1 is a drawing of an exemplary communications system 100 supporting cellular and DSRC communications in accordance with an exemplary embodiment. Exemplary communications system 100 includes a plurality of safety systems (safety system 1 102, . . . , safety system N 104). Exemplary safety system 1 102 is, e.g., a node including base station and server functionality. Exemplary safety system N 104 includes a base station 103 coupled to a core network element 105, e.g., a server node.

Exemplary communications system 100 further includes a plurality of stationary DSRC devices, a plurality of mobile DSRC devices, a plurality of multi-mode communications device with cellular and DSRC capability, and a plurality of mobile cellular devices. In system 100, stationary DSRC devices (stationary DSRC device 1 106, . . . , stationary DSRC device N 108) are coupled to safety system 1 102 via backhaul network 122. Mobile DSRC devices (mobile DSRC device 1 110, . . . , mobile DSRC device N 112) are located in the cellular coverage area of safety system 102. Multi-mode mobile cellular/DSRC devices (multi-mode mobile cellular/DSRC device 1 114, . . . , multi-mode mobile cellular/DSRC device N 116) are located in the cellular coverage area of safety system 102. Mobile cellular devices (mobile cellular device 1 118, . . . , mobile cellular device N 120) are located in the cellular coverage area of safety system 102.

In system 100, stationary DSRC devices (stationary DSRC device 1' 124, . . . , stationary DSRC device N 126') are coupled to core network element 105 of safety system N 104 via backhaul network 140. In some embodiments, backhaul network 122 and backhaul network 140 are coupled together. Mobile DSRC devices (mobile DSRC device 1' 128, . . . , mobile DSRC device N' 130) are located in the cellular coverage area of base station 103 of safety system N 104. Multi-mode mobile cellular/DSRC devices (multi-mode mobile cellular/DSRC device 1' 132, . . . , multi-mode mobile cellular/DSRC device N' 134) are located in the cellular coverage area of base station 103 of safety system N 104. Mobile cellular devices (mobile cellular device 1' 136, . . . , mobile cellular device N' 138) are located in the cellular coverage area of base station 103 of safety system N 104.

In exemplary system 100, information communicated in DSRC signals is further distributed, e.g., to devices without DSRC radios, via the cellular communications system. In addition, the cellular network may, and sometimes does communicate safety message digest reports.

Figure 2:
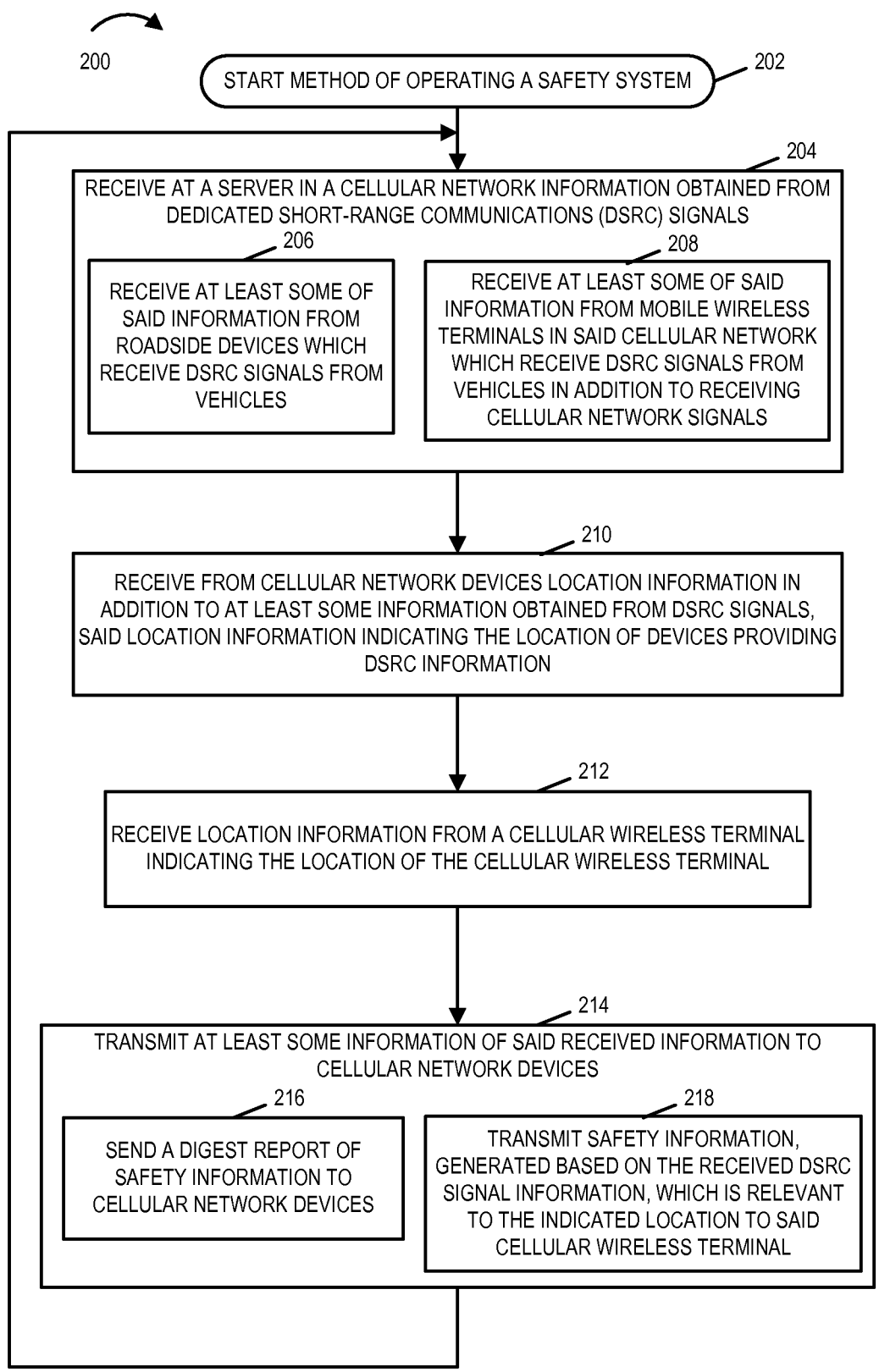
FIG. 2 is flowchart of an exemplary method of operating a safety system in accordance with various exemplary embodiments.

FIG. 2 is flowchart 200 of an exemplary method of operating a safety system in accordance with various exemplary embodiments. The safety system implementing the method of flowchart 200 is, e.g., safety system 102 or safety system 104 of system 100 of FIG. 1. Operation starts in step 202 where the safety system is powered on and initialized. Operation proceeds from start step 202 to step 204, in which the safety system receives at a server in a cellular network information obtained from dedicated short-range communications (DSRC) signals. Step 204 includes one or more of steps 206 and 208. In step 206, the safety system receives at least some of said information from roadside devices (e.g., stationary DSRC device 1 106) which receive DSRC signals from vehicles. In step 208, the safety system receives at least some of said information from mobile wireless terminals in said cellular network which receive DSRC signals from vehicles in addition to receiving cellular network signals (e.g., multi-mode mobile cellular/DSRC device 1 114). Operation proceeds from step 204 to step 210.

In step 210, the safety system receives from cellular network devices (e.g., multi-mode mobile cellular/DSRC device 1 114) location information, e.g., GPS location information, in addition to at least some of said information obtained from DSRC signals, said location information indicating the location of devices providing DSRC information. Operation proceeds from step 210 to step 212.

In step 212, the safety system receives location information from a cellular wireless terminal (e.g., mobile cellular device 1 118 or multi-mode mobile cellular/DSRC device 1 114) indicating the location of the cellular wireless terminal. In one example, the received location information is from a cellular wireless terminal without a DSRC radio and is reported to provide additional location data to the safety system. The received location information allows the safety system to identify the location of the cellular wireless terminal without DSRC capability with respect to other devices which include DSRC capability. Thus, the safety system can have any overall view of the locations of devices with and without DSRC capability. In another example, the received location information is communicated to the safety system from a cellular wireless terminal without a DSRC radio and is reported as part of a request for DSRC information or a request for a report including DSRC information or a request for a report based on DSRC information. In yet another example, the received location information is communicated to the safety system from a cellular wireless terminal with a DSRC radio and is reported as part of a request for DSRC information or a request for a report including DSRC information or a request for a report based on DSRC information. In some embodiments, DSRC information communicated in response to the request may include information corresponding to DSRC capable devices which are outside the range of the cellular wireless terminal which transmitted the request and/or may include safety message information from devices without DSRC capability. Operation proceeds from step 212 to step 214.

In step 214, the safety system transmits at least some information of said received information to cellular network devices (e.g., mobile cellular device 1 118, multi-mode mobile cellular/DSRC device 1 114). In one example, the transmission of step 214 is a broadcast transmission. In some embodiments, the broadcast transmission is in accordance with a predetermined schedule. In some embodiments, different reports are broadcast at different points in time, e.g., corresponding to different geographic regions and/or different types of reports, e.g., communicating different types of information. In another example, the transmission of step 214 is a multi-cast transmission intended for a particular set of cellular network devices. In another example, the transmission of step 214 is a unicast transmission directed to a particular cellular network device. In some embodiments, the unicast transmission is a response to a request from the particular cellular network device. In some embodiments, the safety system selects a device to send a unicast transmission including at least some safety message information in response to a perceived threat to the selected device and/or user of the selected device, e.g., a possible collision or the potential of being run over by an approaching vehicle. In some embodiments, different information is transmitted to different cellular network devices, e.g., as a function of device location. Step 214 includes one or more of steps 216 and 218. In step 216, the safety system sends a digest report of safety information to cellular network devices. In some embodiments, the digest report includes safety information obtained from cellular devices which do not support DSRC communication (e.g., mobile cellular device 1 118), multimode devices which support DSRC communication and cellular communication (e.g., multi-mode mobile cellular/DSRC device 1) and at least some devices which support just DSRC communication (e.g., stationary DSRC device 1 106, mobile DSRC device 1 110).

In step 218, the safety system transmits safety information, generated based on the received DSRC signal information, which is relevant to the indicated location to said cellular wireless terminal. In some embodiments, said cellular wireless terminal, to which safety information is transmitted in step 218, does not include a DSRC signal receiver. In some embodiments, the safety information indicates when it is safe to cross a street. In some embodiments, the safety information indicates the location and path of nearby vehicular traffic. Operation proceeds from step 214 to step 204.

In some embodiments, prior to step 214, the safety system predicts trajectories of vehicles, e.g., predicts trajectories of motor vehicles based on information communicated in DSRC signals transmitted from the motor vehicles. In some such embodiments, the safety system identifies if a user of a cellular wireless terminal, e.g., a pedestrian, is expected to be in the path of a predicted trajectory of a vehicle. In some such embodiments, the safety system generates a safety message warning the user of the cellular wireless terminal in response to a predicted trajectory of a vehicle which may be dangerous for the user of the cellular wireless terminal. This generated safety message is, e.g., transmitted in step 218.

Figure 3:
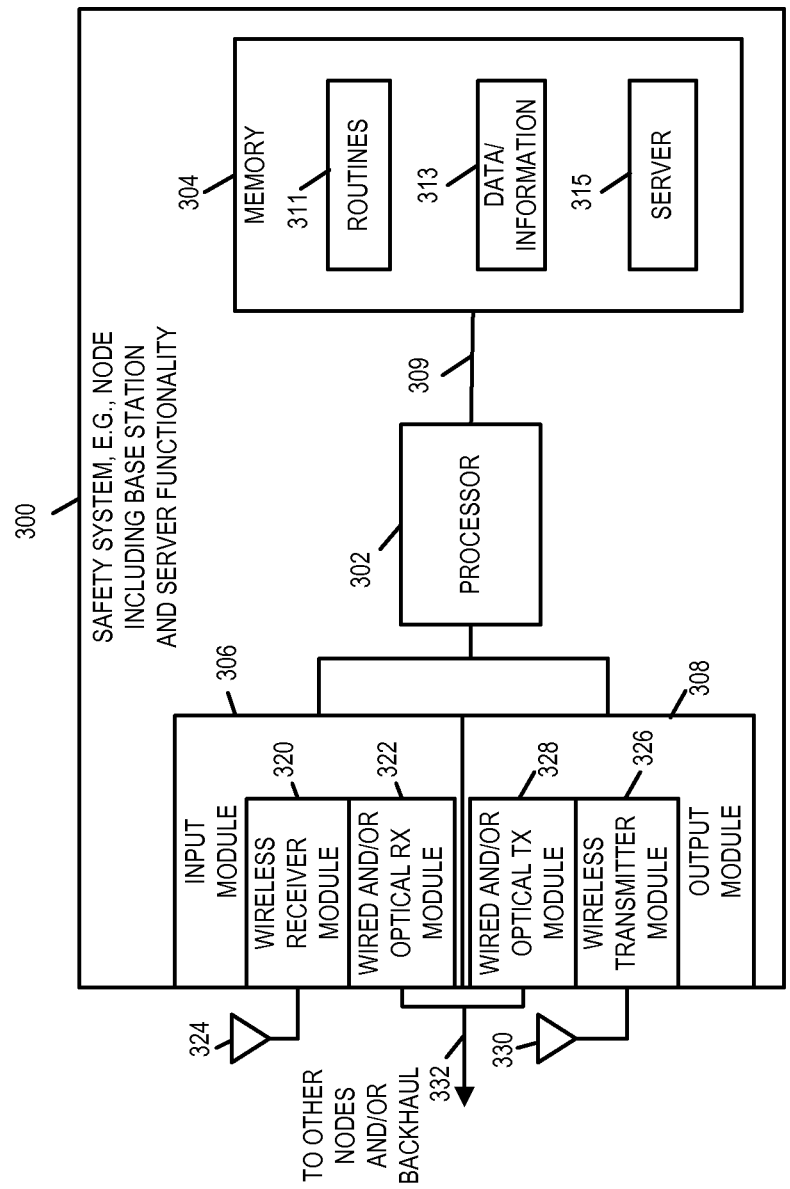
FIG. 3 is a drawing of an exemplary safety system, e.g., a node including base station and server functionality, in accordance with an exemplary embodiment.

FIG. 3 is a drawing of an exemplary safety system 300, e.g., a node including base station and server functionality, in accordance with an exemplary embodiment. Exemplary safety system 300 is, e.g., exemplary safety system node 102 of system 100 of FIG. 1. Safety system 300 may, and sometimes does, implement a method in accordance with flowchart 200 of FIG. 2. Safety system 300 includes a processor 302 and memory 304 coupled together via a bus 309 over which the various elements (302, 304) may interchange data and information. Safety system 300 further includes an input module 306 and an output module 308 which may be coupled to processor 302 as shown. However, in some embodiments, the input module 306 and output module 308 are located internal to the processor 302. Input module 306 can receive input signals. Input module 306 includes a wireless receiver module 320 for receiving input including over wireless communications links. Input module 306 also includes a wired and/or optical input receiver module 322 for receiving input over a wired and/or optical link. Output module 308 includes a wireless transmitter module 326 for transmitting output signals over wireless communications links. Output module 308 also includes a wired and/or optical output transmitter module 328 for transmitting output signals over a wired and/or optical link. Memory 304 includes routines 311, data/information 313, and a server 315.

Safety system 300 further includes wireless communications receive antenna 324 coupled to wireless receiver module 320 and wireless communications transmit antenna 330 coupled to wireless transmitter module 326. In some embodiments, the same antenna is used for both input and output wireless communications signaling. The wired and/or optical receiver module 322 and the wired and/or optical transmitter module 328 are coupled to other nodes and/or a backhaul via link 332.

In various embodiments, processor 302 is configured to receive at a server in a cellular network, e.g., server 315, information obtained from dedicated short-range communications (DSRC) signals via input module 306 and transmit via output module 308 at least some information of said received information to cellular network devices. In some embodiments, processor 302 is configured to receive, via input module 306, at least some of said information from roadside devices which receive DSRC signals from vehicles, as part of being configured to receive at a server in a cellular network information obtained from dedicated short-range communications signals.

In various embodiments, processor 302 is configured to receive, via input module 306, at least some of said information from mobile wireless terminals in said cellular network which receive DSRC signals from vehicles in addition to receiving cellular network signals (e.g., multi-mode mobile cellular/DSRC device 1 114), as part of being configured to receive at a server in a cellular network information obtained from dedicated short-range communications signals. In some such embodiments, processor 302 is further configured to receive from cellular network devices location information, e.g., GPS location information, in addition to said at least some information obtained from DSRC signals, said location information indicating the location of the devices providing DSRC information.

In some embodiments, processor 302 is configured to send, via output module 308, a digest report of safety information to cellular network devices, as part of being configured to transmit at least some information of said received information to cellular network devices. In some such embodiments, said digest report includes safety information obtained from cellular devices which do not support DSRC communication, multimode devices which support DSRC communication and cellular communication and at least some devices which support just DSRC communication.

In some embodiments, processor 302 is configured to receive location information, e.g., GPS location information, from a cellular wireless terminal indicating the location of the cellular wireless terminal. In some such embodiments, processor 302 is further configured transmit (via output module 308) safety information, generated based on received DSRC signal information, which is relevant to the indicated location to said cellular wireless terminal, as part of being configured to transmit at least some information of said received information to cellular network devices. In some such embodiments, the cellular wireless terminal does not include a DSRC signal receiver. In some embodiments, the said safety information indicates when it is safe to cross a street. In some embodiments, said safety information indicates the location and path of nearby vehicular traffic.

Figure 4:
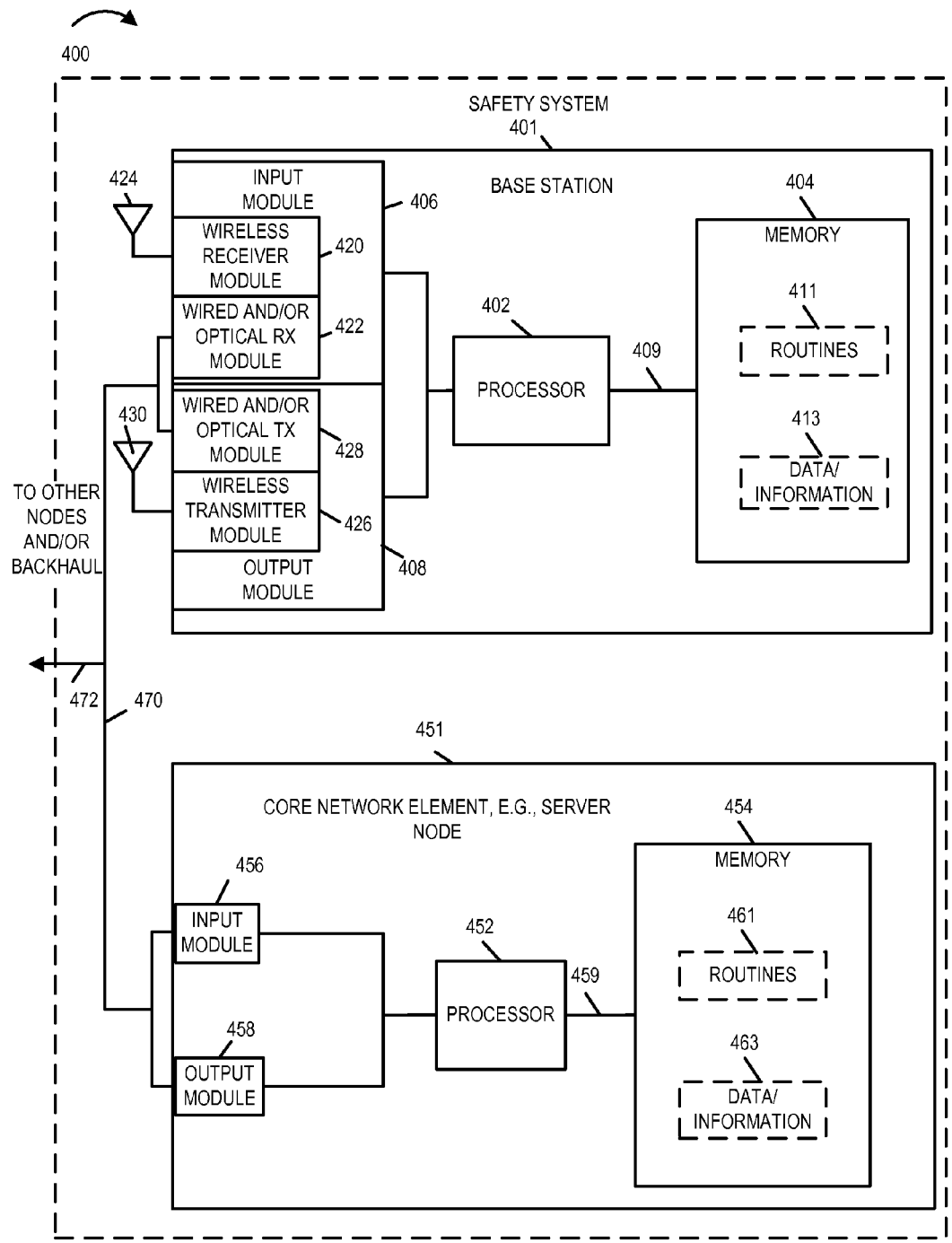
FIG. 4 is a drawing of an exemplary safety system, e.g., a base station supporting cellular wireless communications, and a core network element such as a server node, in accordance with an exemplary embodiment.

FIG. 4 is a drawing of an exemplary safety system 400 in accordance with an exemplary embodiment. Exemplary safety system 400 includes a base station 401 supporting cellular wireless communications, and a core network element 451, e.g., a server node. Exemplary safety system 400 is, e.g., exemplary safety system node 104 of system 100 of FIG. 1. Safety system 400 may, and sometimes does, implement a method in accordance with flowchart 200 of FIG. 2.

Base station 401 includes a processor 402 and memory 404 coupled together via a bus 409 over which the various elements (402, 404) may interchange data and information. Base station 401 further includes an input module 406 and an output module 408 which may be coupled to processor 402 as shown. However, in some embodiments, the input module 406 and output module 408 are located internal to the processor 402. Input module 406 can receive input signals. Input module 406 includes a wireless receiver module 420 for receiving input including over wireless communications links. Input module 406 also includes a wired and/or optical input receiver module 422 for receiving input over a wired and/or optical link. Output module 408 includes a wireless transmitter module 426 for transmitting output signals over wireless communications links. Output module 408 also includes a wired and/or optical output transmitter module 428 for transmitting output signals over a wired and/or optical link. Memory 404 includes routines 411 and data/information 413.

Base station 401 further includes wireless communications receive antenna 424 coupled to wireless receiver module 420 and wireless communications transmit antenna 430 coupled to wireless transmitter module 426. In some embodiments, the same antenna is used for both input and output wireless communications signaling.

Core network element 451 includes a processor 452 and memory 454 coupled together via a bus 459 over which the various elements (452, 454) may interchange data and information. Core network element 451 further includes an input module 456 and an output module 458 which may be coupled to processor 452 as shown. However, in some embodiments, the input module 456 and output module 458 are located internal to the processor 452. Input module 456 can receive input signals. Input module 456 includes a wired and/or optical input receiver module for receiving input over a wired and/or optical link. Output module 458 also includes a wired and/or optical output transmitter module for transmitting output signals over a wired and/or optical link. Memory 454 includes routines 461 and data/information 463.

The wired and/or optical receiver module 422 and wired and/or optical transmitter module 428 of base station 401 are coupled to the input module 456 and output module 458 of core network element 451 via link 470. The various modules (422, 428, 456, 458) are also coupled to other nodes and/or a backhaul network via link 472.

Figure 5:
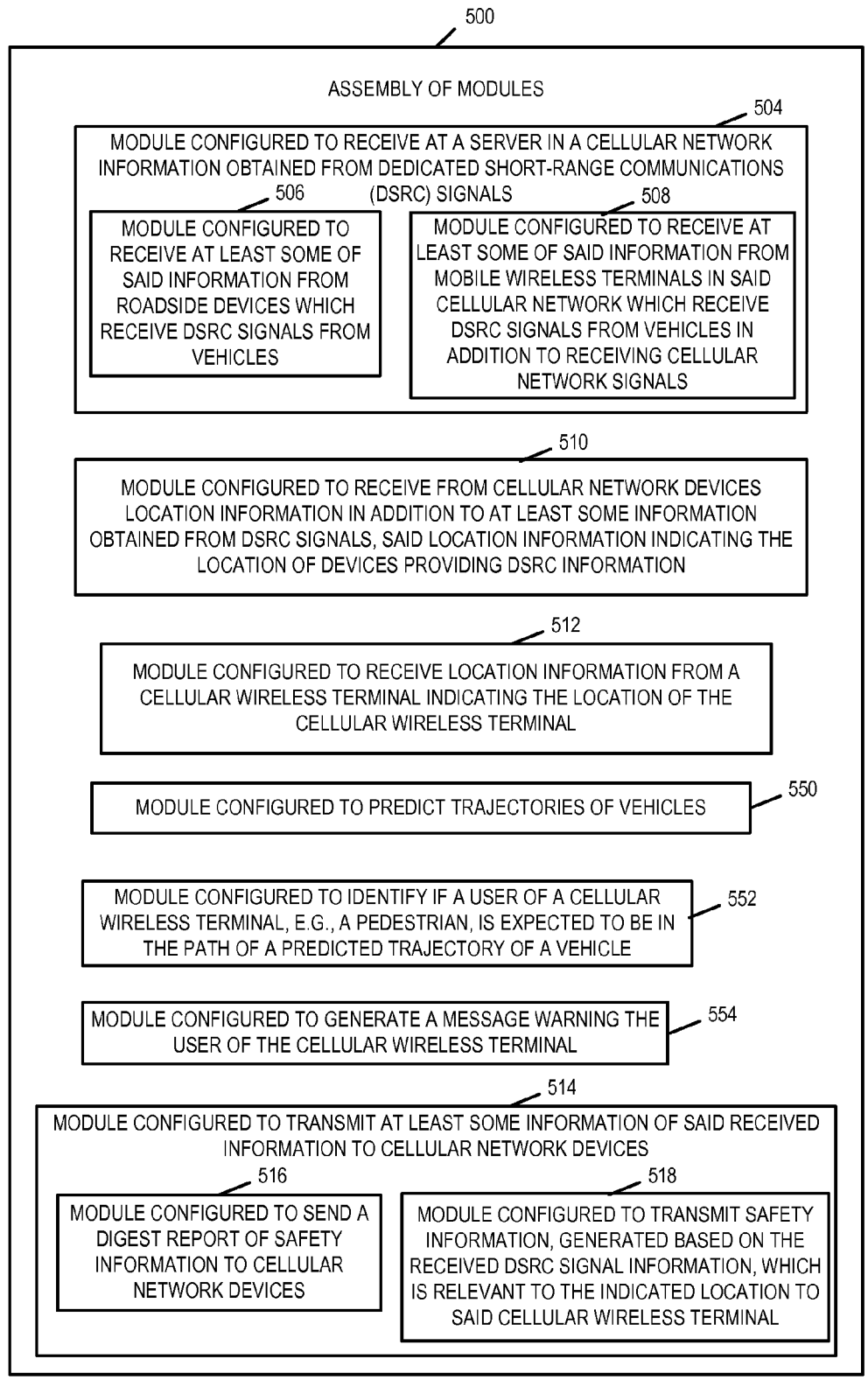
FIG. 5 is an assembly of modules which can be used in the exemplary safety system illustrated in FIG. 3 or in the exemplary safety system illustrated in FIG. 4.

FIG. 5 is an assembly of modules 500 which can, and in some embodiments is, used in the exemplary safety system 300 illustrated in FIG. 3. The modules in the assembly 500 can be implemented in hardware within the processor 302 of FIG. 3, e.g., as individual circuits. The modules in the assembly 500 can, and in some embodiments are, implemented fully in hardware within the processor 302, e.g., as individual circuits. In other embodiments some of the modules are implemented, e.g., as circuits, within the processor 302 with other modules being implemented, e.g., as circuits, external to and coupled to the processor. As should be appreciated the level of integration of modules on the processor and/or with some modules being external to the processor may be one of design choice. Alternatively, rather than being implemented as circuits, all or some of the modules may be implemented in software and stored in the memory 304 of safety system 300 shown in FIG. 3 with the modules controlling operation of the safety system 300 to implement the functions corresponding to the modules when the modules are executed by a processor, e.g., processor 302. In still other embodiments, various modules are implemented as a combination of hardware and software, e.g., with a sensor or another circuit external to the processor providing input to the processor 302 which then under software control operates to perform a portion of a module's function.

Alternatively, the modules may be implemented in software and stored in the memory 304 of safety system 300 shown in FIG. 3. In some such embodiments, the assembly of modules 500 is included in routines 311 of memory 304 of safety system 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 500. In embodiments where the assembly of modules 500 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 5 control and/or configure the safety system 300 or elements therein such as the processor 302, to perform the functions of the corresponding steps illustrated and/or described in the method of flowchart 200 of FIG. 2.

FIG. 5 is an assembly of modules 500 which can, and in some embodiments is, used in the exemplary safety system 400 illustrated in FIG. 4. The modules in the assembly 500 can be implemented in hardware within the processor 402 and/or within the processor 452 of FIG. 4, e.g., as individual circuits. Alternatively, the modules may be implemented in software and stored in the memory 404 of base station 402 and/or in memory 452 of core network element 451 shown in FIG. 4. In some embodiments, a first portion of assembly of modules 500 is included in routines 411 of memory 404 of base station 401 and a second portion of assembly of modules 400 is included in routines 461 of memory 454 of core network element 451 of safety system 400 of FIG. 4. While shown in the FIG. 4 embodiment as a single processor 402, e.g., computer, within base station 401 and a single processor 452, e.g., computer, within core network element 451, it should be appreciated that processor 402 and/or processor 452 may be implemented as one or more processors, e.g., computers. When implemented in software the modules include code, which when executed by the processor, configure the processor, e.g., computer, to implement the function corresponding to the module. In some embodiments, processor 402 in combination with processor 452 is configured to implement each of the modules of the assembly of modules 500. In embodiments where the assembly of modules 500 is stored in the combination of memory 404 and memory 454, the memories 404 and 454 are computer program products, each computer program product comprising a computer readable medium, e.g., a non-transitory computer readable medium, comprising code, e.g., individual code for each module, for causing at least one computer, e.g., processor, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 5 control and/or configure the safety system 400 or elements therein such as the processor 402 and/or processor 452, to perform the functions of the corresponding steps illustrated and/or described in the method of flowchart 200 of FIG. 2.

FIG. 5 is an assembly of modules 500 in accordance with various embodiments. Assembly of modules 500 includes a module 504 configured to receive at a server in a cellular network information obtained from dedicated short-range communications (DSRC) signals, a module 510 configured to receive from cellular network devices location information, e.g., GPS location information, in addition to at least some information obtained from DSRC signals, said location information indication the location of devices providing DSRC information, a module 512 configured to receive location information from a cellular wireless terminal indicating the location of the cellular wireless terminal, and a module 514 configured to transmit at least some information of said received information to cellular network devices. Module 504 includes a module 506 configured to receive at least some of said information from roadside devices which receive DSRC signals from vehicles and a module 508 configured to receive at least some of said information from mobile wireless terminals in said cellular network which receive DSRC signals from vehicles in addition to receiving cellular network signals. Module 514 includes a module 516 configured to send a digest report of safety information to cellular network devices and a module 518 configured to transmit safety information, generated based on the received DSRC information, which is relevant to the indicated location, to said cellular wireless terminal.

In some embodiments, the digest report sent by module 516 includes safety information obtained from cellular devices which do not support DSRC communication, multi-mode devices which support DSRC communication and cellular communication and at least some devices which support just DSRC communication. In various embodiments, said cellular wireless terminal to which safety information is transmitted by module 518 does not include a DSRC signal receiver. In some embodiments, the safety information indicates when it is safe to cross a street. In some embodiments, the safety information indicates the location and path of nearby vehicular traffic.

Assembly of modules 500 further includes a module 550 configured to predict trajectories of vehicles, e.g., trajectories of motor vehicles transmitting DSRC vehicular safety messages, a module 552 configured to identify if a user of a cellular wireless terminal, e.g., a pedestrian, is expected to be in the path of a predicted trajectory of a vehicle, and a module 554 configured to generate a message warning the user, e.g., pedestrian, of the cellular wireless terminal. In various embodiments, module 554 is activated in response to an identification of module 552. The warning is, e.g., a warning not to enter a crosswalk or a warning that a vehicle is entering a driveway in the vicinity of the pedestrian.

Figure 6:
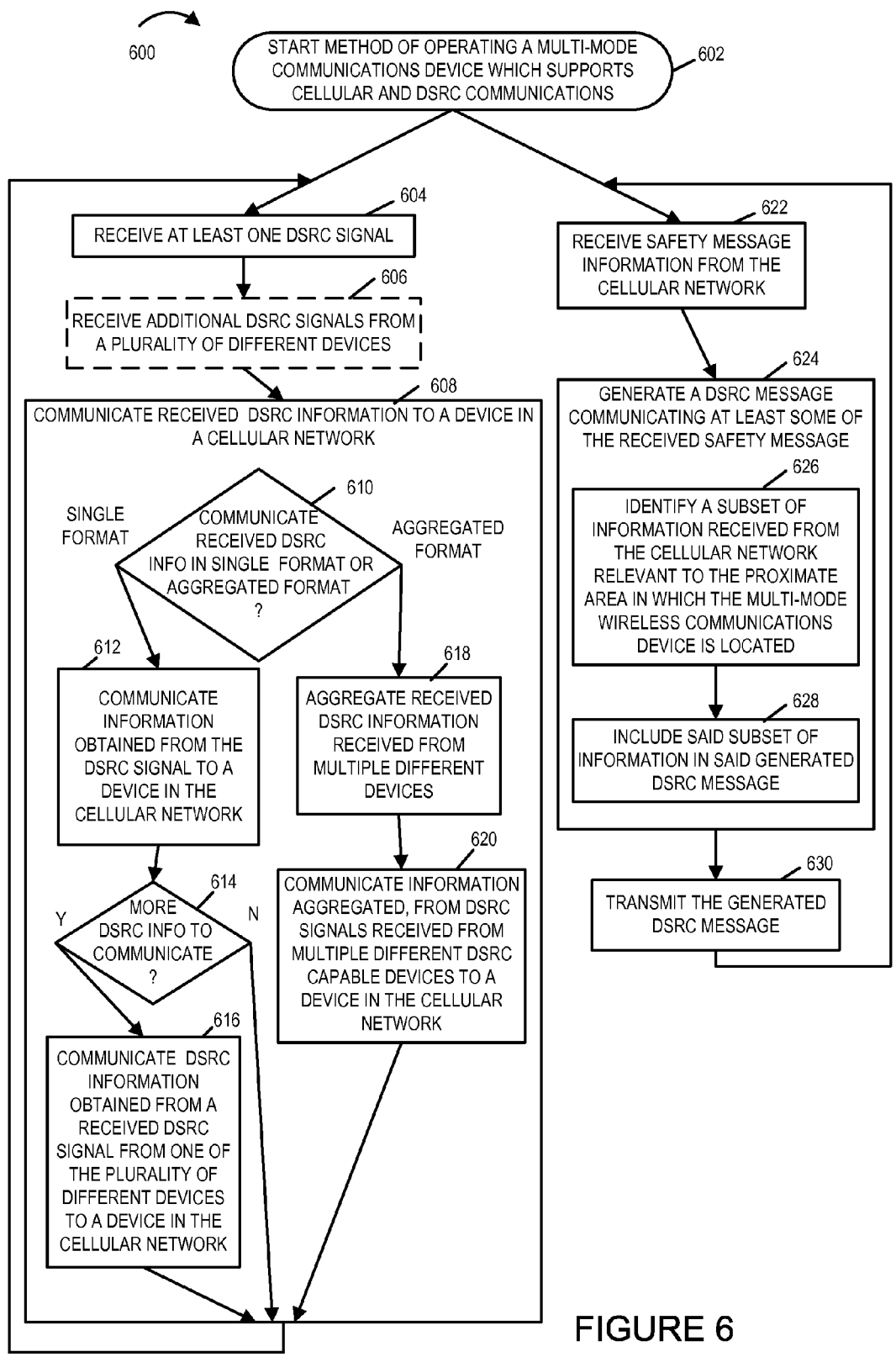
FIG. 6 is a flowchart of an exemplary method of operating a multi-mode communications device which supports cellular and DSRC communications, in accordance with various exemplary embodiments.

FIG. 6 is a flowchart 600 of an exemplary method of operating a multi-mode communications device which supports cellular and DSRC communications, in accordance with various exemplary embodiments. The multi-mode communications device implementing the method of flowchart 600 is, e.g., one of the multi-mode communications devices (114, 116, 142, 134) of system 100 of FIG. 1. Operation of the exemplary method starts in step 602, where the multi-mode communications device is powered on and initialized. Operation proceeds from step 602 to step 604 and step 622. In step 604 the multi-mode communications device receives at least one DSRC signal. In some embodiments, operation may, and sometimes does, proceeds from step 604 to step 606, in which the multi-mode communications device receives additional DSRC signals from a plurality of different devices. Operation proceeds from step 606 to step 608. In some embodiments, operation proceeds from step 604 to step 608.

In step 608, the multi-mode communications device communicates received DSRC information to a device in a cellular network, e.g., to a base station. Step 608 includes steps 610, 612, 614, 616, 618 and 620. In step 610 the multi-mode communications device decides if the multi-mode communications device is going to communicate received DSRC information in single format or aggregated format. If the multi-mode communications device decides that it is going to communicate received DSRC information in single format, then operation proceeds from step 610 to step 612; otherwise, operation proceeds from step 610 to step 618. Returning to step 612, in step 612 the multi-mode communications device communications information obtained from the DSRC signal, e.g., a DSRC signal received in step 604 from a first device, to a device in the cellular network, e.g., to a base station. Operation proceeds from step 612 to step 614. In step 614 the multi-mode communications device determines whether or not there is more received DSRC information to communicate to the device in the cellular network. If the multi-mode communications device determines that there is more DSRC information to communicate, then operation proceeds from step 614 to step 616; otherwise, operation proceeds from step 614 to the input of step 604. Returning to step 616, in step 616 the multi-mode communications device communicates DSRC information obtained from a received DSRC signal from one of the plurality of different devices to a device in a cellular network. Operation proceeds from step 616 to the input of step 604.

Returning to step 610, if in step 610 the multi-mode communications device decides that it intends to communicate received DSRC signal information in an aggregated format, then operation proceeds from step 610 to step 618. In step 618, the multi-mode communications device aggregates received DSRC information received from multiple different devices, and then in step 620, the multi-mode communications device communicates information aggregated, from DSRC signals received from multiple different DSRC capable devices to a device in the cellular network. Operation proceeds from step 620 to the input of step 604, where the multi-mode communications device receives at least one more DSRC signal.

Returning to step 622, in step 622 the multi-mode communications device receives safety message information from the cellular network. In some embodiments, the safety message information from the cellular network includes at least one of a safety message digest report corresponding to a geographic region, weather alerts, traffic alerts, or construction alerts.

Operation proceeds from step 622 to step 624. In step 624, the multi-mode communications device generates a DSRC message communicating at least some of the received safety message. Step 624 includes steps 626 and 628. In step 626 the multi-mode communications device identifies a subset of information received from the cellular network relevant to the proximate area in which the multi-mode wireless communications device is located. Operation proceeds from step 626 to step 628. In step 628, the multi-mode communications device includes said subset of information in said generated DSRC message. Operation proceeds from step 624 to step 630, in which the multi-mode communications device transmits the generated DSRC message. In some embodiments, the transmitted generated DSRC message is a broadcast message available to any other devices with DSRC capability in the vicinity, e.g., within recoverable range of the transmission. In some embodiments, the transmitted generated DSRC message is intended for a particular device including a DSRC receiver in the vicinity. The information communicated in the transmitted generated DSRC message may be particularly useful to devices without cellular capability. Thus, in some embodiments, the multi-mode communications device distributes information to devices without cellular communications capability that would otherwise not be available to them. In some embodiments, the multi-mode communicates device and/or the safety system have a better overview of the system than a device without cellular communications capability and/or have more computing resources, memory, resources, time and/or power available to be used for monitoring the system. For example, the multi-mode communications device or the safety system has identified a potential collision, a potential danger situation or a potential alert condition that may affect a particular device without cellular capability. In some embodiments the identified potential collision, potential danger situation or potential alert condition is based on estimated and/or projected paths of devices. In some embodiments, the multi-mode communications device transmits the generated DSRC message including a warning to the device which may be in danger or may find the information useful, e.g., for taking action, e.g., altering an intended course, changing speed, etc., or delaying taking an action, e.g., waiting to cross a street. Operation proceeds from step 630 to the input of step 622 where the multi-mode communications device receives additional safety message information from the cellular network.

In some embodiments, the exemplary method includes steps in which the multi-mode communications device detects a potential collision based on safety message information, and the multi-mode communications device generates a message indicating a warning of a potential collision. In some such embodiments, the exemplary method further includes one or both of: a step in which the multi-mode communications device transmits a DSRC collision warning message, e.g., via a DSRC radio, and a step in which the multi-mode communications device transmits a collision warning message to a device in the cellular network, e.g., to a base station via uplink signals.

Figure 7:
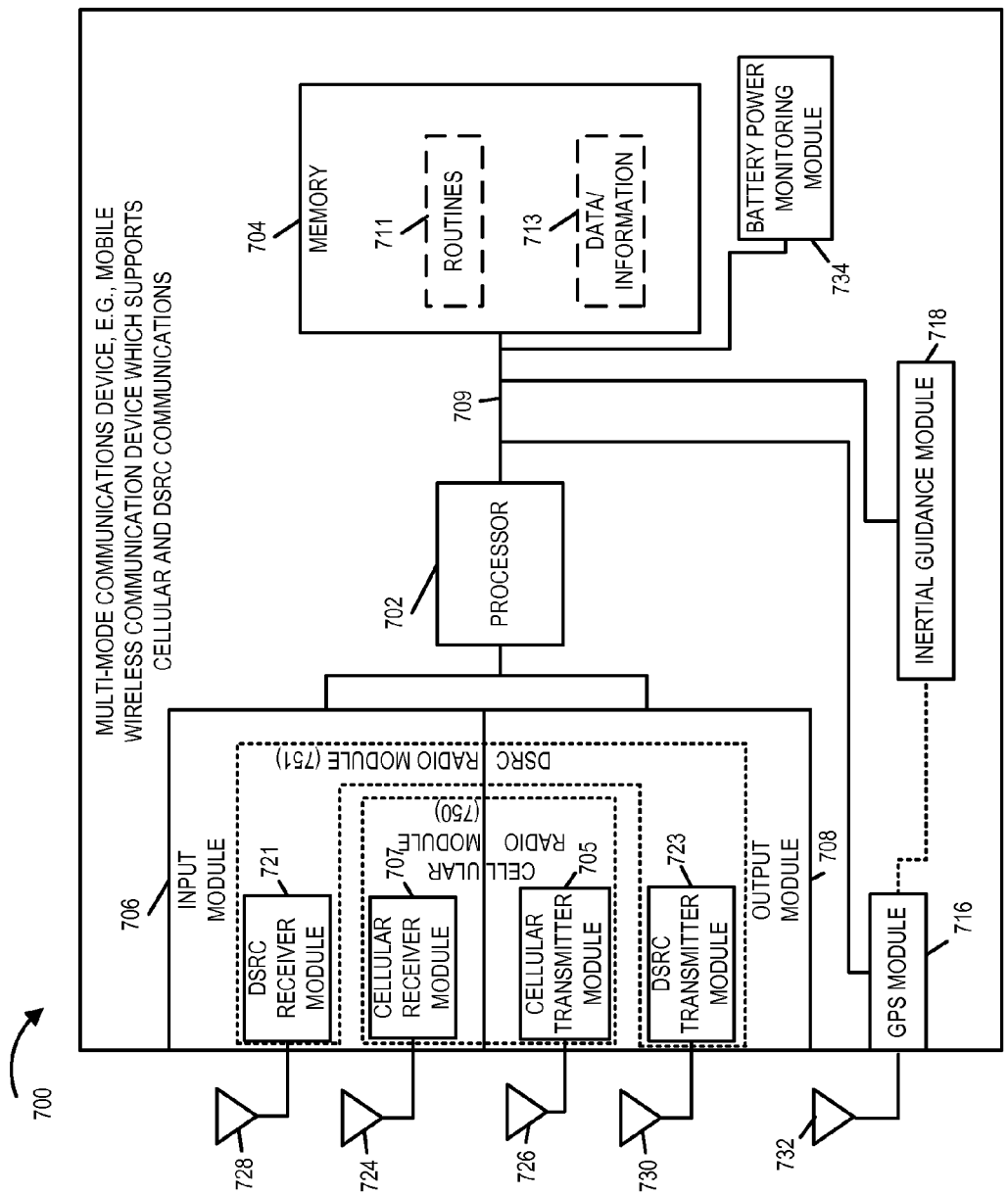
FIG. 7 is a drawing of an exemplary multi-mode communications device, e.g., a mobile wireless communications device which supports cellular and DSRC communications, in accordance with an exemplary embodiment.

FIG. 7 is a drawing of an exemplary multi-mode communications device 700, e.g., a mobile wireless communications device which supports cellular and DSRC communications, in accordance with an exemplary embodiment. The multi-mode communications device is, e.g., one of the multi-mode communications devices (114, 116, 142, 134) of system 100 of FIG. 1. In various embodiments, multi-mode communications device 700 supports a cellular communications mode of operation and a DSRC communications mode of operation. In some embodiments, multi-mode communications device 700 supports a cellular communications mode of operation, a DSRC communications mode of operation, and a combined mode of operation in which cellular and DSRC communications are occurring concurrently. In some such embodiments, the concurrent transmission of cellular and DSRC signals is supported by device 700.

Exemplary multi-mode communications device 700 is, e.g., one of the multi-mode wireless communications devices of system 100 of FIG. 1. Multi-mode communications device 700 may, and sometimes does, implement a method in accordance with flowchart 600 of FIG. 6.

Multi-mode communications device 700 includes a processor 702 and memory 704 coupled together via a bus 709 over which the various elements (702, 704) may interchange data and information. Multi-mode communications device 700 further includes an input module 706 and an output module 708 which may be coupled to processor 702 as shown. However, in some embodiments, the input module 706 and output module 708 are located internal to the processor 702. Input module 706 can receive input signals. Input module 706 includes a cellular receiver module 707, e.g., a wireless cellular receiver, for receiving cellular signals. Input module 706 also includes a DSRC receiver module 721, e.g., a wireless DSRC receiver, for receiving DSRC signals. In some, but not necessarily all, embodiments, the cellular receiver module 707 uses different frequency bands and/or different communications protocols than the DSRC receiver module 721. In some embodiments, input module 706 also includes a wired or optical input interface for receiving input.

Output module 708 includes a cellular transmitter module 705, e.g., a wireless cellular transmitter, for transmitting cellular signals. Output module 708 further includes a DSRC transmitter module 723, e.g., a wireless DSRC transmitter, for transmitting DSRC signals. In some, but not necessarily all, embodiments, the cellular transmitter module 705 uses different frequency bands and/or different communications protocols than the DSRC transmitter module 723.

In various embodiments, the DSRC receiver module 721 and the DSRC transmitter module 723 are included as part of a DSRC radio module 751, e.g., a DSRC radio. In various embodiments, cellular receiver module 707 and the cellular transmitter module 705 are included as part of a cellular radio module 750, e.g., a cellular radio. In some embodiments, output module 708 also includes a wired or optical output interface for transmitting output. In some embodiments, memory 704 includes routines 711 and data/information 713.

Multi-mode communications device 700 further includes a cellular wireless communications receive antenna 724 coupled to cellular receiver module 707 and a cellular wireless communications transmit antenna 726 coupled to cellular transmitter module 705. Multi-mode communications device 700 further includes a DSRC wireless communications receive antenna 728 coupled to DSRC receiver module 721 and a DSRC wireless communications transmit antenna 730 coupled to DSRC transmitter module 723 In some embodiments, the same antenna is used for one or more or all of cellular transmission, cellular reception, DSRC transmission, and DSRC reception.

Multi-mode communications device 700 further includes a GPS module 716 coupled to GPS antenna 732 via which the multi-mode communications device 700 may receive GPS signals. GPS module 716, e.g., an embedded GPS receiver, processes received GPS signals and outputs GPS information, e.g., GPS time information, GPS determined position fix information, GPS determined velocity information, GPS determined altitude information, GPS determined heading information, and GPS accuracy information. Output GPS information is used in determining device location information.

Inertial guidance module 718, e.g., a module including multiple gyroscopes and multiple accelerometers, provides inertial guidance information used in generating device location information, e.g., latitude/longitude information and altitude information, device velocity information, device acceleration information, device heading information including true heading information and magnetic heading information, device attitude information, e.g., roll, pitch, yaw, and device angular rate information. In some embodiments, the inertial guidance module 718 is included as part of a navigation unit included in multi-mode communications device 700. In some embodiments, the inertial guidance module 718 includes a plurality of discrete inertial measurement components, e.g., discrete accelerometers and/or gyroscopes. In some embodiments, the inertial guidance module 718 includes a gyroscope on a chip. In some embodiments, the inertial guidance module 718 includes an accelerometer or accelerometer triad on a chip. In some embodiments, the inertial guidance module 718 is an inertial measurement unit (IMU) on a chip. In some embodiments, the inertial guidance module 718 is included in a chip including processor 702. In various embodiments, the GPS module 716 is coupled to the inertial guidance module 718. In some embodiments, the inertial guidance module 718 aids the GPS module 716, e.g., during intervals of poor GPS reception. GPS module 716 and inertial guidance module 718 are coupled to bus 709.

Multi-mode communications device 700 further includes a battery power monitoring module 734 configured to determine an amount of remaining battery power for multi-mode communications device 700. In some embodiments, the determined amount of remaining battery power is used by the multi-mode communications device 700 in controlling whether or not the multi-mode communications device participates in the dissemination of DSRC information with regard to cellular devices without DSRC capability, e.g., when remaining battery power is below a predetermined level, device 700 is controlled to refrain from participating in some or all of a set of operations related to the dissemination of DSRC information with regard to cellular devices without DSRC capability.

In some embodiments, processor 702 is configured to receive at least one DSRC signal (e.g., via DSRC radio module 751) and communicate information obtained from the DSRC signal to a device in the cellular network (e.g., via cellular radio module 750). Processor 702, in various embodiments, is further configured to receive additional DSRC signals (e.g., via DSRC radio module 751) from a plurality of different devices and communicate (e.g., via cellular radio module 750) information aggregated from DSRC signals received from multiple different DSRC capable devices.

In some embodiments, processor 702 is further configured to receive (e.g., via cellular radio module 750) safety message information from the cellular network, generate a DSRC message communicating at least some of the received safety message and transmit (e.g., via DSRC radio module 751) the generated DSRC message. In some such embodiments, the safety message information from the cellular network includes at least one of a safety message digest report corresponding to a geographic region, weather alerts, traffic alerts, or construction alerts. In some such embodiments, processor 702 is configured to identify a subset of information received from the cellular network relevant to the proximate area in which the multimode device is located and include said subset of information in said generated DSRC message, said DSRC message communicating less than all the information received from the cellular network, as part of being configured to generate a DSRC message.

Figure 8:
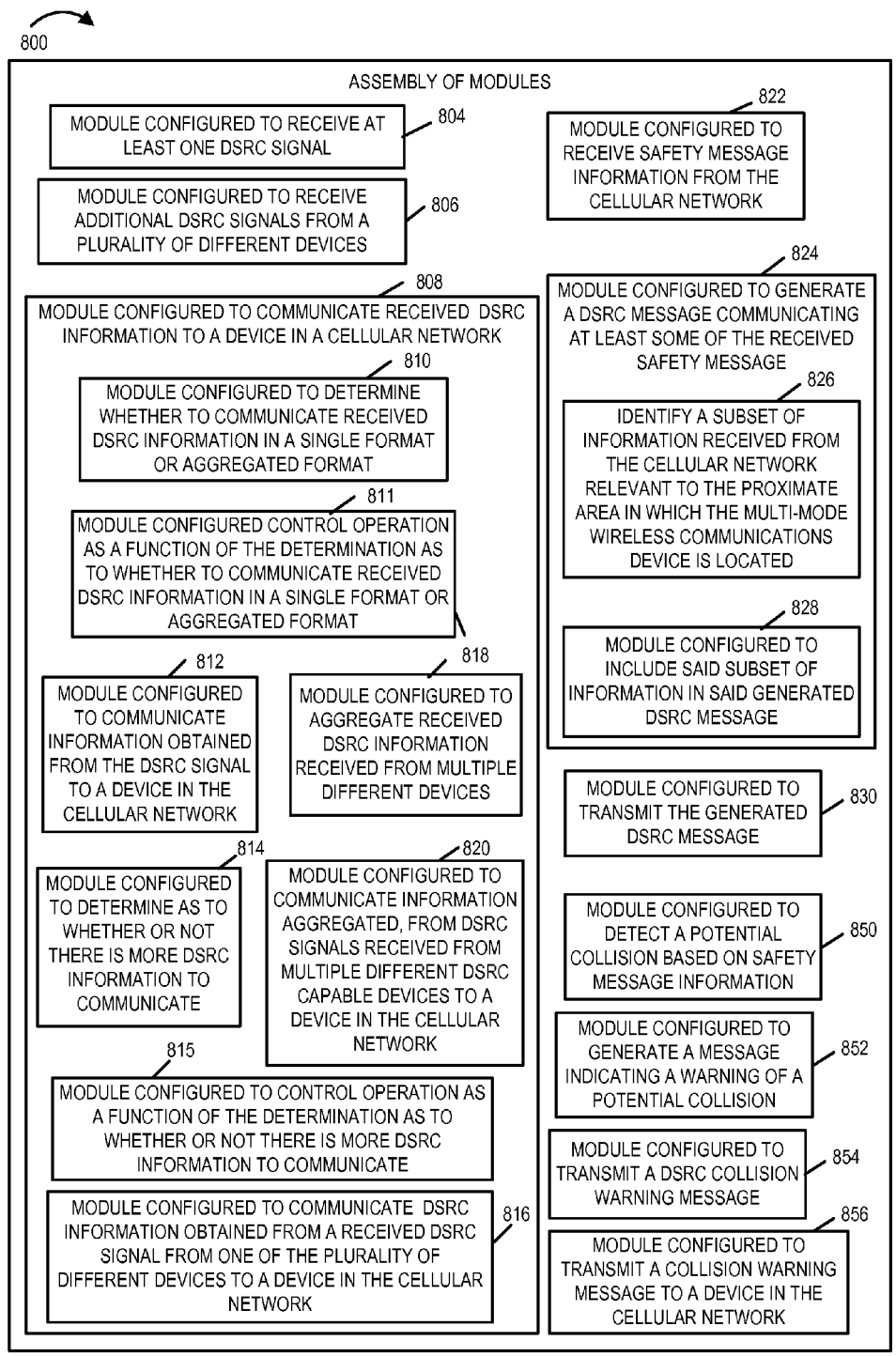
FIG. 8 is an assembly of modules which can be used in the exemplary multi-mode communications device illustrated in FIG. 7.

FIG. 8 is an assembly of modules 800 which can, and in some embodiments is, used in the multi-mode communications device 700 illustrated in FIG. 7. The modules in the assembly 800 can, and in some embodiments are, implemented fully in hardware within the processor 702, e.g., as individual circuits. In other embodiments some of the modules are implemented, e.g., as circuits, within the processor 702 with other modules being implemented, e.g., as circuits, external to and coupled to the processor. As should be appreciated the level of integration of modules on the processor and or with some modules being external to the processor may be one of design choice. In some but not necessarily all embodiments modules 810, 811, 814, 815, 818, 824, 826, 828, 850, 852 are implemented in the processor with the other modules being implemented in the processor and/or external to the processor. Alternatively, rather than being implemented as circuits, all or some of the modules may be implemented in software and stored in the memory 704 of multi-mode communications device 700 shown in FIG. 7 with the modules controlling operation of the communications device 700 to implement the functions corresponding to the modules when the modules are executed by a processor, e.g., processor 702. In still other embodiments, various modules are implemented as a combination of hardware and software, e.g., with a sensor or another circuit external to the processor 702 providing input to the processor 702 which then under software control operates to perform a portion of a module's function.

While shown in the FIG. 7 embodiment as a single processor 702, e.g., computer, within device 700, it should be appreciated that processor 702 may be implemented as one or more processors, e.g., computers. When implemented in software, the modules include code, which when executed by the processor, configure the processor, e.g., computer, to implement the function corresponding to the module. In some embodiments, processor 702 is configured to implement each of the modules of the assembly of modules 800. In embodiments where the assembly of modules 800 is stored in memory 704, and the memory 704 is a computer program product, the computer program product comprising a computer readable medium, e.g., a non-transitory computer readable medium, comprising code, e.g., individual code for each module, for causing at least one computer, e.g., processor, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 8 control and/or configure the device 700 or elements therein such as the processor 702 to perform the functions of the corresponding steps illustrated and/or described in the method of flowchart 600 of FIG. 6.

FIG. 8 is an assembly of modules 800 in accordance with various embodiments. Assembly of modules 800 includes a module 804 configured to receive at least one DSRC signal, a module 806 configured to receive additional DSRC signals from a plurality of different devices, and a module 808 configured to communicate received DSRC information to a device in a cellular network. Module 808 includes a module 810 configured to determine whether to communicate received DSRC information in a single format or an aggregated format, a module 811 configured to control operation as a function of the determination as to whether to communicate received DSRC information in a single format or aggregated format, a module 812 configured to communicate information obtained from the DSRC signal to a device in the cellular network, a module 814 configured to determine as to whether or not there is more DSRC information to communicate, a module 815 configured to control operation as a function of the determination as to whether or not there is more DSRC information to communicate, and a module 816 configured to communicate DSRC information obtained from a received DSRC signal from one of the plurality of different devices to a device in the cellular network. Module 808 further includes a module 818 configured to aggregate received DSRC information received from multiple different devices and a module 820 configured to communicate information aggregated from DSRC signals received from multiple different DSRC capable devices to a device in the cellular network.

Assembly of modules 800 further includes a module 822 configured to receive safety message information from the cellular network, a module 824 configured to generate a DSRC message communicating at least some the received safety message information, and a module 830 configured to transmit the generated DSRC message. Module 824 includes a module 826 configured to identify a subset of information received from the cellular network relevant to the proximate area in which the multi-mode communications device is located and a module 828 configured to include said subset of information in said generated DSRC message. In some embodiments, the safety message information from the cellular network includes at least one of a safety message digest report corresponding to a geographic region, weather alerts, traffic alerts, or construction alerts.

Assembly of modules 800 further includes a module 850 configured to detect a potential collision based on safety message information, a module 852 configured to generate a message indicating a warning of a potential collision, a module 854 configured to transmit a DSRC collision warning message, e.g., via a DSRC radio, and a module 856 configured to transmit a collision warning message to a device in the cellular network, e.g., to a base station via uplink signals.

Figure 9:
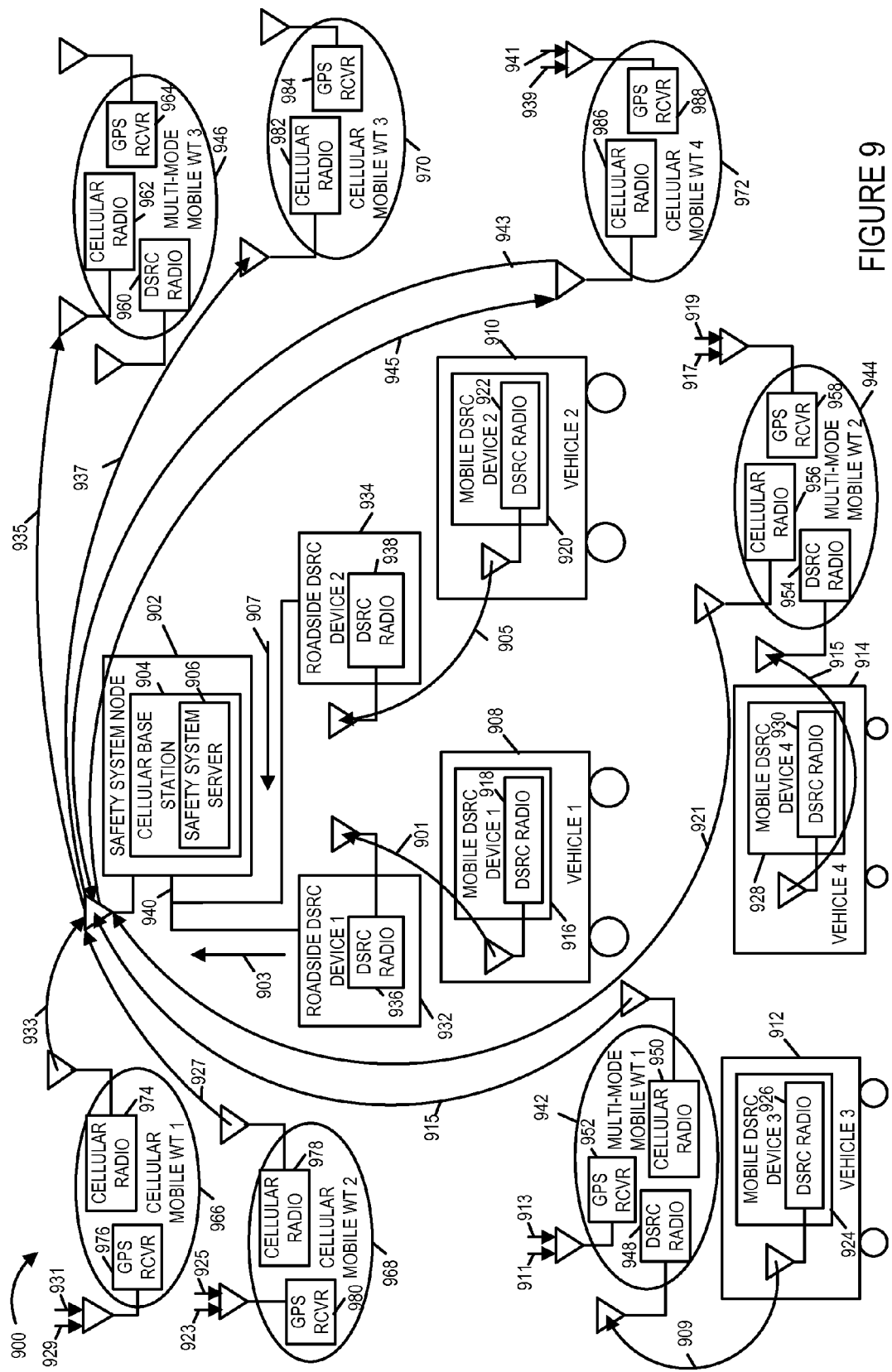
FIG. 9 is a drawing illustrating exemplary signaling in an exemplary communications system supporting cellular and DSRC communications in accordance with an exemplary embodiment.

FIG. 9 is a drawing 900 illustrating exemplary signaling in an exemplary communications system supporting cellular and DSRC communications in accordance with an exemplary embodiment. The exemplary communications system of FIG. 9 includes a safety system node 902, a plurality of roadside DSRC devices (roadside DSRC device 1 932, roadside DSRC device 2 934, and a plurality of mobile DSRC devices installed in vehicles (mobile DSRC device 1 916 installed in vehicle 1 908, mobile DSRC device 2 920 installed in vehicle 2 910, mobile DSRC device 3 924 installed in vehicle 3 912, mobile DSRC device 4 928 installed in vehicle 4 914). The exemplary communications system of FIG. 9 further includes a plurality of multi-mode mobile wireless terminals (multi-mode mobile wireless terminal 1 942, multi-mode mobile wireless terminal 2 944, multi-mode wireless terminal 3 946) and a plurality of cellular mobile wireless terminals (cellular mobile wireless terminal 1 966, cellular mobile wireless terminal 2 968, cellular mobile wireless terminal 3 970, cellular wireless terminal 4 972). The multi-mode wireless terminals of FIG. 9 are, e.g., multi-mode wireless communications devices in accordance with exemplary device 700 of FIG. 7.

Safety system node 902 includes a cellular base station 904 which includes a safety system server 906. Safety system node 902 is, e.g., safety system node 300 of FIG. 3. Safety system node 902 supports cellular wireless communications and communications via a backhaul 940. The backhaul 940 couples safety system node 902 to roadside DSRC device 1 932 and roadside DSRC device 2 934. Roadside DSRC device 1 932 includes DSRC radio 936, and roadside DSRC device 2 934 includes DSRC radio 938.

Each vehicle installed DSRC device (mobile DSRC device 1 916, mobile DSRC device 2 920, mobile DSRC device 3 924, mobile DSRC device 4 928) includes a DSRC radio (DSRC radio 918, DSRC radio 922, DSRC radio 926, DSRC radio 930), respectively. Each multi-mode mobile wireless terminal includes a DSRC radio supporting DSRC wireless communications, a cellular radio supporting cellular wireless communications and a GPS receiver for receiving and processing GPS signals. Multi-mode mobile WT 1 942 includes DSRC radio 948, cellular radio 950 and GPS receiver 952. Multi-mode mobile WT 2 944 includes DSRC radio 954, cellular radio 956 and GPS receiver 958. Multi-mode mobile WT 3 946 includes DSRC radio 960, cellular radio 962 and GPS receiver 964. Each cellular mobile wireless terminal includes a cellular radio for supporting cellular wireless communications and a GPS receiver for receiving and processing GPS signals. Cellular mobile WT 1 966 includes cellular radio 974 and GPS receiver 976. Cellular mobile WT 2 968 includes cellular radio 978 and GPS receiver 980. Cellular mobile WT 3 970 includes cellular radio 982 and GPS receiver 984. Cellular mobile WT 4 972 includes cellular radio 986 and GPS receiver 988.

Mobile DSRC device 1 916 of vehicle 1 908 generates and transmits DSRC signals 901. Roadside DSRC device 1 932 receives DSRC signals 901, processes the received signals, generates signals 903 including information from the received DSRC signals 901, and transmits the generated signals 903 including received DSRC information to safety system node 902 via backhaul network 940. Safety system node 902 receives signals 903 and its safety system server 906 receives communicated information obtained from DSRC signals 901.

Mobile DSRC device 2 920 of vehicle 2 910 generates and transmits DSRC signals 905. Roadside DSRC device 2 934 receives DSRC signals 905, processes the received signals, generates signals 907 including information from the received DSRC signals 905, and transmits the generated signals 907 including received DSRC information to safety system node 902 via backhaul network 940. Safety system node 902 receives signals 907, and its safety system server 906 receives communicated information obtained from DSRC signals 905.

Mobile DSRC device 3 924 of vehicle 3 912 generates and transmits DSRC signals 909. Multi-mode mobile WT 1 942 receives DSRC signals 903 via its DSRC radio 948. Multi-mode mobile WT 1 942 receives GPS signals (911, 913) via its GPS receiver 952 and determines GPS information, e.g., its position, its altitude, its velocity, and its heading, based on the received GPS signals (911, 913). Multi-mode WT 1 942 generates and transmits cellular uplink signals 915 to cellular base station 904 of safety system node 902. Cellular uplink signals 915 include received information communicated in received DSRC signals 909 and GPS information including determined multimode device 1 location information based on the received GPS signals (911, 913). Cellular base station 904 of safety system node 902 receives cellular uplink signals 915 and recovers the communicated information including the DSRC information obtained from DSRC signals 909 and the location of multi-mode mobile WT 1. Safety system server 906 receives the recovered information.

Mobile DSRC device 4 928 of vehicle 4 914 generates and transmits DSRC signals 915. Multi-mode mobile WT 2 944 receives DSRC signals 915 via its DSRC radio 930. Multi-mode mobile WT 2 944 receives GPS signals (917, 919) via its GPS receiver 958 and determines GPS information, e.g., its position, its altitude, its velocity, and its heading, based on the received GPS signals (917, 919). Multi-mode WT 2 944 generates and transmits cellular uplink signals 921 to cellular base station 904 of safety system node 902. Cellular uplink signals 921 include received information communicated in received DSRC signals 915 and GPS information including determined multi-mode mobile WT 2 944 location information based on the received GPS signals (917, 919). Cellular base station 904 of safety system node 902 receives cellular uplink signals 921 and recovers the communicated information including the DSRC information obtained from DSRC signals 915 and the location of multi-mode mobile WT 2 944. Safety system server 906 receives the recovered information.

Cellular mobile WT 1 966 receives GPS signals (929, 931) via its GPS receiver 976 and determines GPS information, e.g., its position, its altitude, its velocity, and its heading, based on the received GPS signals (929, 931). Cellular WT 1 966 would like to communicate a safety message to other communications devices, but lacks a DSRC radio. Cellular WT 1 966 generates uplink cellular signals 933 and transmits the uplink signals 933 to cellular base station 904 of safety system node 902. Uplink signals 933 include a safety message and GPS based information including the determined cellular mobile WT 1 966 device location information based on the received GPS signals (929, 931). Cellular base station 904 of safety system node 902 receives cellular uplink signals 933 and recovers the communicated information including cellular mobile WT 1's generated safety message and the location of cellular mobile WT 1 966. Safety system server 906 receives the recovered information.

Cellular mobile WT 2 968 receives GPS signals (923, 925) via its GPS receiver 980 and determines GPS information, e.g., its position, its altitude, its velocity, and its heading, based on the received GPS signals (923, 925). Cellular mobile WT 2 968 would like to communicate a safety message to other communications devices, but lacks a DSRC radio. Cellular WT 2 968 generates uplink cellular signals 927 and transmits the uplink signals 927 to cellular base station 904 of safety system node 902. Uplink signals 927 include a safety message and GPS based information including the determined cellular mobile WT 2 968 device location information based on the received GPS signals (923, 925). Cellular base station 904 of safety system node 902 receives cellular uplink signals 927 and recovers the communicated information including cellular mobile WT 2's generated safety message and the location of cellular mobile WT 2 968. Safety system server 906 receives the recovered information.

Safety system node 902 generates one or more digest reports of received information including safety message information corresponding to vehicle 1 908, vehicle 2 910, vehicle 3 912, vehicle 4 914, cellular mobile WT 1 966 and cellular WT 2 968. The digest report includes safety information obtained from cellular mobile devices which do not support DSRC communications, e.g., devices 966 and 968, multi-mode mobile devices which support DSRC communications and cellular communications, e.g., devices 942 and 944, and at least some devices which support just DSRC communications, e.g., devices 932 and 934. In some embodiments, different digest reports are generated corresponding to different area within the base station cellular coverage area, e.g., including relevant information to a particular area and omitting information which is not relevant to a particular area. In some embodiments, a safety message digest report is communicated via a unicast downlink signal. In some embodiments, a safety message digest report is communicated via a multi-cast downlink signal. In some embodiments, a safety message digest report is communicated via a broadcast signal.

In this example, cellular base station 904 of safety system node 902 transmits downlink signals 935 communicating a generated safety message digest report. Multi-mode mobile WT 3 946 receives downlink signals 935 and recovers the communicated safety message digest report. It should be noted that even though multi-mode mobile WT 3 946 includes a DSRC radio 960, multi-mode mobile WT 3 946 may have been unable to recover directly via its DSRC radio 960 some or all of the safety message information communicated in the digest report because of range considerations, e.g., the distance between DSRC radio 926 of vehicle 3 912 and DSRC radio 960 of multi-mode mobile WT 3 946 exceeds an acceptable DSRC range. Thus, the cellular network may be, and sometimes is, used to extend the range of DSRC safety message communications.

In this example, cellular base station 904 of safety system node 902 transmits downlink signals 937 communicating a generated safety message digest report. Cellular mobile WT 3 970 receives downlink signals 937 and recovers the communicated safety message digest report.

Cellular mobile WT 4 972 receives GPS signals (939, 941) via its GPS receiver 988 and determines GPS information, e.g., its position, its altitude, its velocity, and its heading, based on the received GPS signals (939, 941). Cellular mobile WT 4 972 would like to receive safety message from other communications devices but lacks a DSRC radio. Cellular WT 4 972 generates uplink cellular signals 943 and transmits the uplink signals 943 to cellular base station 904 of safety system node 902. Uplink signal 943 includes GPS based information including the determined cellular mobile WT 4 device location information based on the received GPS signals (939, 941). In some embodiments, the uplink signals 943 include a request for safety message information. In some embodiments, the uplink signals 943 include a safety message. In one embodiment, the safety message communicated in the uplink signals 943 is an intent to cross a road.

Base station 904 receives uplink signals 943 and recovers the communicated information. Safety system node 902, e.g., its safety system server 906, determines safety information relevant to cellular mobile WT 4 972 based on the received location information of device 972. In some embodiments, safety system node 902 determines safety information relevant to cellular mobile WT 4 972 based on the direction of travel of mobile WT 4 972 and/or other information communicated to safety system node 902, e.g., and intent to cross a road. In some embodiments, safety system node 902 communicates safety messages or portions of safety messages received from other devices. In some embodiments, safety system node communicates processed information relevant to mobile WT 4 972, e.g., safety information indicating when it is safe to cross a street and/or information indicating the location and path of nearby vehicular traffic. In some embodiments, the safety information may be, and sometimes is, derived from DSRC messages or messages received from nearby vehicles. Safety system node 902 generates downlink signals 945 including the safety information that it has decided to communicate to cellular wireless terminal 4 972. Cellular base station 904 transmits the generated downlink signals 945 to cellular mobile WT 4 972 including safety message information. Cellular mobile WT 4 972 receives downlink signals 945 via its cellular radio 986 and recovers the communicated safety message information Cellular mobile WT 4 972 communicates the safety message information to a user of WT 4 972 and/or takes an action in response to the safety message information, e.g., sets off an alarm, displays a warning on a display, plays back a stored caution message, etc.

Figure 10:
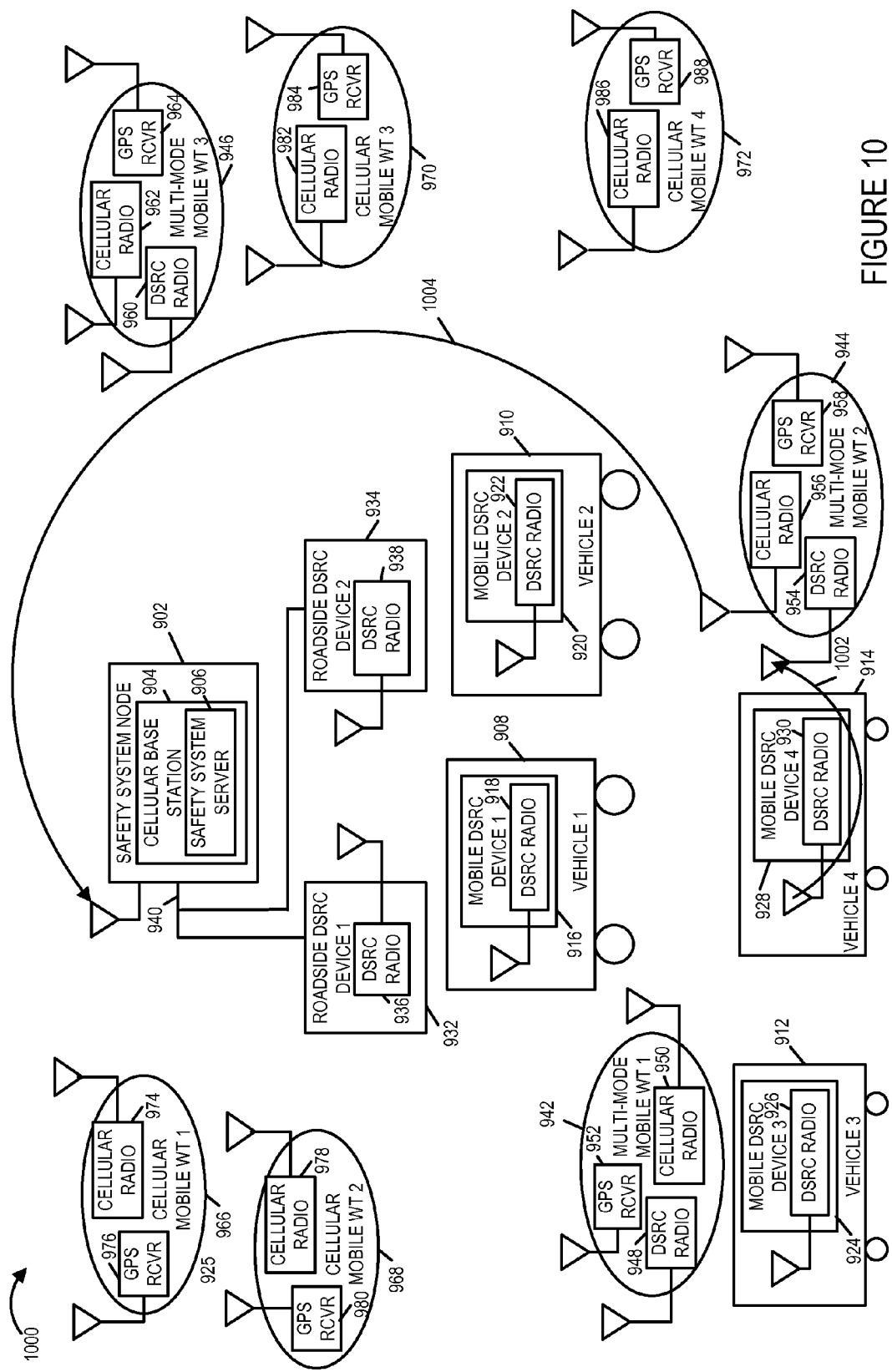
FIG. 10 is a drawing illustrating exemplary signaling in an exemplary communications system in which a mobile wireless communications device, e.g., a cell phone, supports cellular and DSRC communications.

FIG. 10 is a drawing 1000 illustrating exemplary signaling in an exemplary communications system in which a mobile wireless communications device, e.g., a cell phone, supports cellular and DSRC communications in accordance with an exemplary embodiment. The various communications devices previously described in FIG. 9 are included in the example of FIG. 10.

In the example of FIG. 10, multi-mode mobile wireless communication device 2 944, which supports cellular and DSRC communications, receives DSRC signal 1002, which was transmitted from the DSRC radio of vehicle 4 914. Multi-mode mobile wireless communications device 2 944 generates and transmits cellular uplink signal 1004 to cellular base station 904 of safety system node 902. Cellular uplink signal 1004 includes information obtained from DSRC signal 1002.

Figure 11:
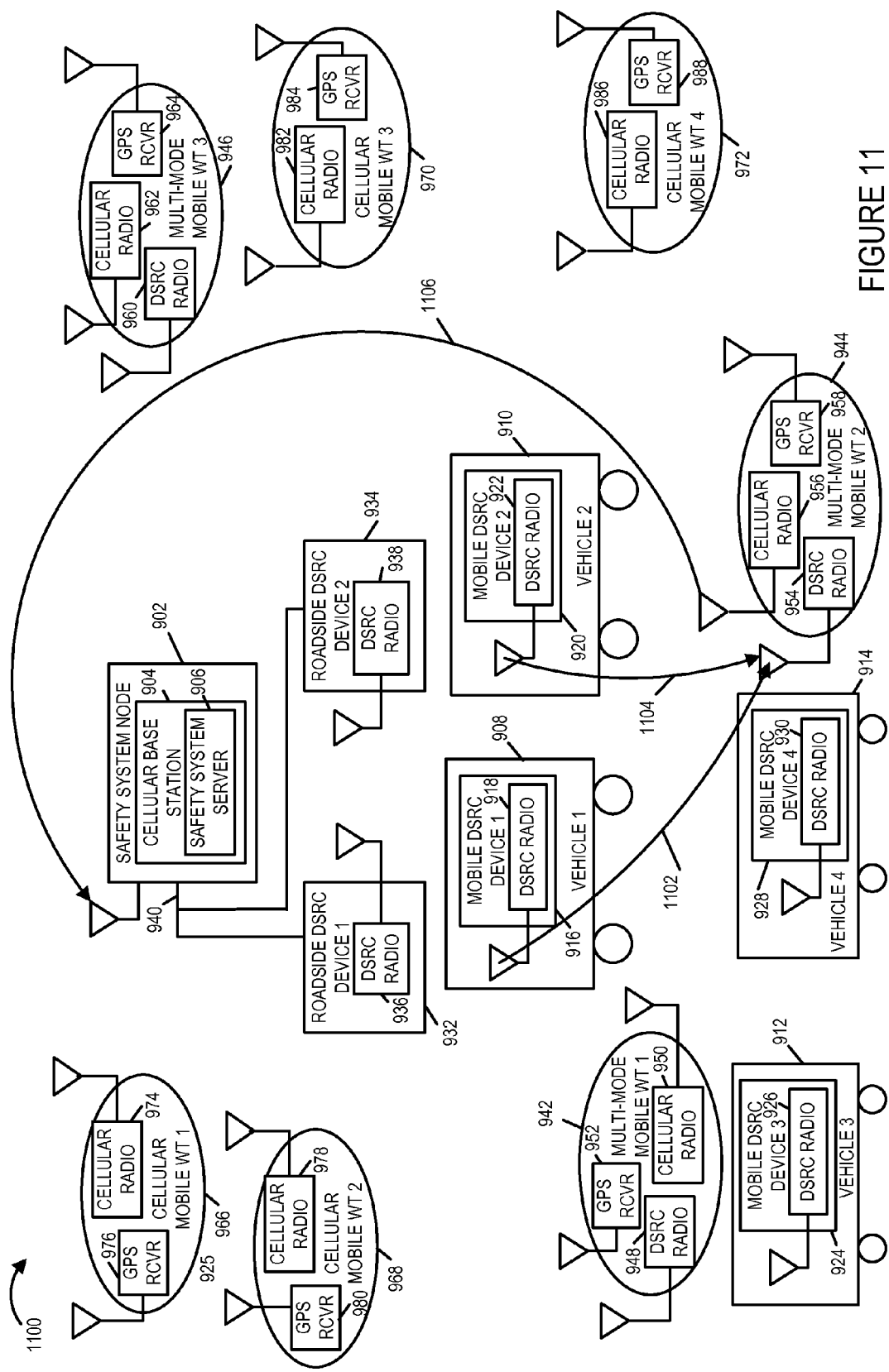
FIG. 11 is a drawing illustrating additional exemplary signaling in an exemplary communications system in which a mobile wireless communications device, e.g., a cell phone, supports cellular and DSRC communications.

FIG. 11 is a drawing 1100 illustrating exemplary signaling in an exemplary communications system in which a mobile wireless communications device, e.g., a cell phone, supports cellular and DSRC communications in accordance with an exemplary embodiment. The various communications devices previously described in FIG. 9 are included in the example of FIG. 11. In one embodiment, the signaling performed in the example of FIG. 11 is performed subsequent to the signaling described in FIG. 10.

In the example of FIG. 11, multi-mode mobile wireless communication device 2 944, which supports cellular and DSRC communications, receives DSRC signal 1102, which was transmitted from the DSRC radio of vehicle 1 908, and DSRC signal 1104, which was transmitted from the DSRC radio of vehicle 2 910. Multi-mode mobile wireless communications device 2 944 generates and transmits cellular uplink signal 1106 to cellular base station 904 of safety system node 902. Cellular uplink signal 1106 includes information aggregated from DSRC signals received from multiple different DSRC capable devices, e.g. information aggregated from received DSRC signal 1102 and received DSRC signal 1104.

Figure 12:
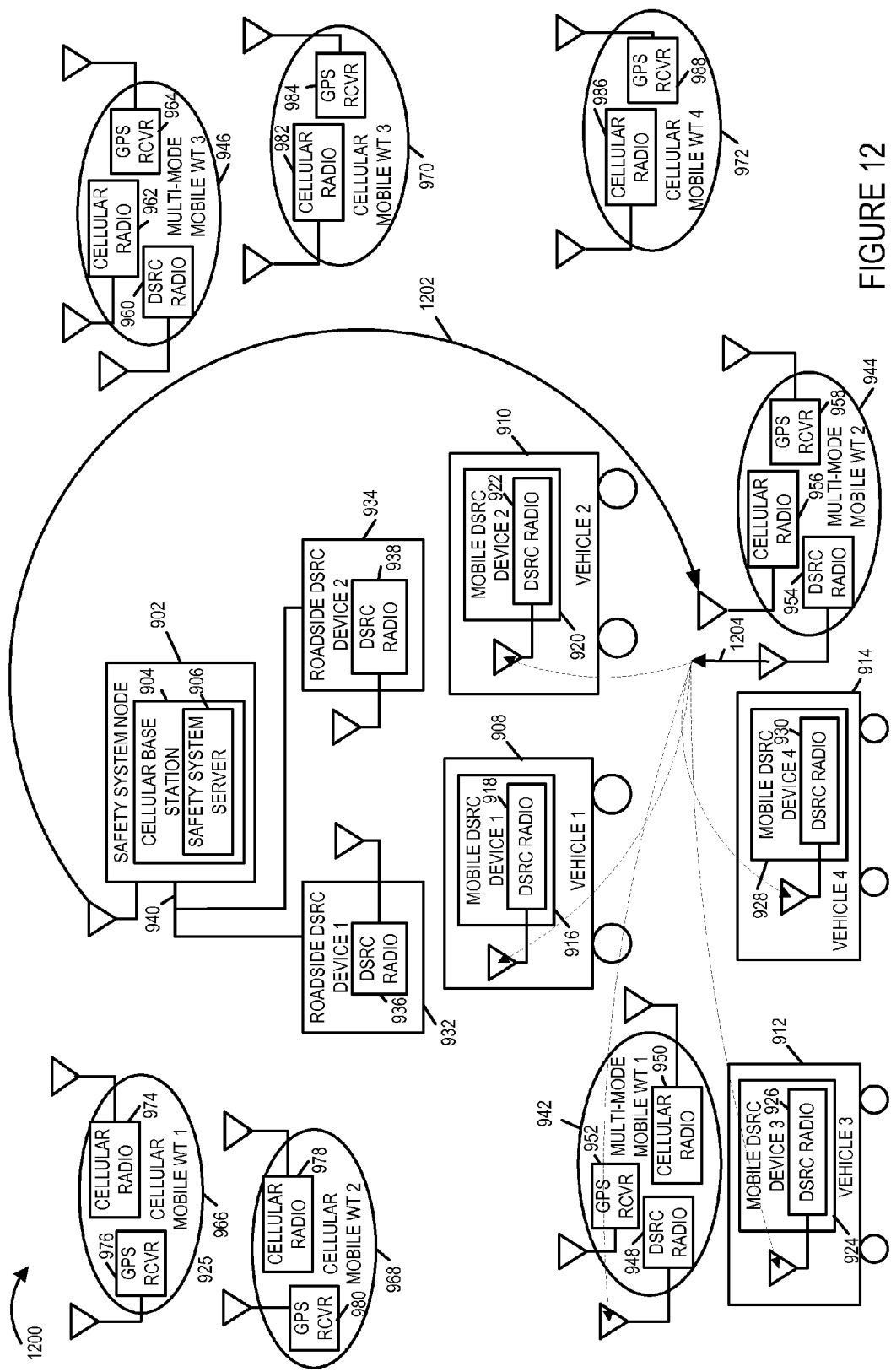
FIG. 12 is a drawing illustrating additional exemplary signaling in an exemplary communications system in which a mobile wireless communications device, e.g., a cell phone, supports cellular and DSRC communications.

FIG. 12 is a drawing 1200 illustrating exemplary signaling in an exemplary communications system in which a mobile wireless communications device, e.g., a cell phone, supports cellular and DSRC communications in accordance with an exemplary embodiment. The various communications devices previously described in FIG. 9 are included in the example of FIG. 12. In one embodiment, the signaling performed in the example of FIG. 12 is performed subsequent to the signaling described in FIG. 11.

In the example of FIG. 12, multi-mode mobile wireless communications device 2 944 receives downlink cellular signals 1202 from cellular base station 904 of safety system node 902. Downlink cellular signals 1202 communicate safety message information from the cellular network. Multi-mode mobile wireless communications device 2 944 generates a DSRC message communicating at least some of the received safety message information. Multi-mode mobile wireless communications device 2 944 transmits the generated DSRC message in DSRC signal 1204. The transmitted DSRC signal 1204, communicating the generated DSRC message, is received and recovered by DSRC capable devices (mobile DSRC device 1 916 of vehicle 1 908, mobile DSRC device 2 920 of vehicle 2 910, mobile DSRC device 3 924 of vehicle 3 912, mobile DSRC device 4 928 of vehicle 4 914, multi-mode mobile WT 1 942). Other DSRC capable devices may be out of range to be able to recover the DSRC signal 1204.

In some embodiments, the safety message information from the cellular network included in cellular signals 1202 includes at least one of a safety message digest report corresponding to a geographic region, weather alerts, traffic alerts, or construction alerts. In some embodiments, multi-mode mobile wireless terminal 2 944 identifies a subset of information received from the cellular network in downlink signals 1202 which is relevant to the proximate area in which the multi-mode wireless communications device 2 944 is located and includes the identified subset of information in the generated DSRC message communicated in transmitted DSRC signal 1204. In some embodiments, the DSRC message communicates less than all the information received from the cellular network in signals 1202.

FIG. 13 is a drawing 1300 illustrating an exemplary communications system in which DSRC safety messages are communicated and safety messages from a base station are communicated in accordance with an exemplary embodiment. The communications system includes a network server 1302 and a base station 1304 coupled together via link 1309. In some embodiments, the network server and the base station are part of the same device. The communications system further includes roadside DSRC devices (1306, 1308), motor vehicle DSRC devices (1314, 1316) mounted within vehicles (1310, 1312), respectively. The communications system further includes a cell phone 1342 held by pedestrian 1340 and a multi-mode cell phone 1338, including DSRC and cellular communications capability, held by pedestrian 1336. The communications system further includes a cell phone 1334 of bicycle rider 1332 who is riding bicycle 1330, and a multi-mode cell phone 1322, including DSRC and cellular communications capability, of bicycle rider 1320 who is riding bicycle 1318, and a multi-mode cell phone 1328, including DSRC and cellular communications capability, of bicycle rider 1326 who is riding bicycle 1324.

Each of the devices with DSRC capability (1306, 1308, 1314, 1316, 1322, 1328, 1338) may send and receive DSRC signals. Each of the mobile devices with cellular communications capability (1322, 1328, 1334, 1338, 1342) may receive downlink cellular signals from base station 1304 and send uplink cellular signals to base station 1304. In various embodiments, at least some of the uplink and downlink signals include safety message information. Base station 1304 transmits downlink signals and receives uplink signals. Roadside DSRC device 1306 is coupled to network server 1302 via link 1305, and roadside DSRC device 1308 is coupled to base station 1304 via link 1307.

DSRC device 1314, e.g., a DSRC radio, of vehicle 1310 is shown transmitting DSRC safety messages 1350 which are received by devices with DSRC capability (1306, 1308, 1322, 1338, 1316, 1328). One or more or all of the devices receiving the safety message information from signals 1350 may, and sometimes do, forward the received safety message information, portions of the received safety message information, and/or information based on received safety message information to the network server 1302 and/or base station 1304. The forwarding path may include one or more of a wireless communications link and a wired and/or optical communications link. The base station 1304 can, and sometimes does, propagate the DSRC safety message, a portion of the DSRC safety message or information based on the DSRC safety message to devices with cellular capability. In this example, safety messages (1352, 1354, 1356, 1358, 1360) from the base station 1304 are transmitted to devices (1322, 1328, 1334, 1342, 1338), respectively via cellular downlink signals. Safety message 1352 is, e.g., a warning not to enter the roadway 1301 at the current time because a vehicle is rapidly approaching. Safety message 1354 is, e.g., a warning to take evasive action because of a potential impending collision from a motor vehicle which is approaching. Safety message 1356 is, e.g., a repeat of a portion of DSRC safety message 1350. Safety message 1358 is a warning not to enter crosswalk 1303 at the present time because a vehicle is rapidly approaching. Safety message 1360 is, e.g., information indicating a warning that a vehicle is about to turn into a driveway and cross over the sidewalk in the vicinity of pedestrian 1336.

Other example, of safety messages which may be communicated via cellular communications include, e.g., a digest report of DSRC safety messages transmitted from a plurality of DSRC devices, a traffic warning, e.g., lane closure, collision ahead, construction ahead, traffic jam, etc, a road condition warning, e.g., flooded road, icy road, pothole, etc., a weather condition warning, a speed limit change, and a command to yield or pull to the side of the road due to an approaching police vehicle, fire vehicle or ambulance. Other examples, of safety messages which may be communicated over the cellular communications include, e.g., a warning that a dangerous driver is approaching, e.g., a warning that a vehicle which is approaching may be operated by a drunk driver, a warning that a vehicle approaching is weaving in and out of traffic or a warning that a vehicle approaching is excessively speeding, etc.

Various aspects and/or features of some embodiments are discussed below. In various embodiments, a device supporting cellular communications, e.g., a cell phone, is an integral part of communicating safety messages between vehicles and pedestrians. The safety messages from different vehicles may be, and sometimes are, received by a roadside unit, e.g., an infrastructure device such as e.g., device 1306, which can, and sometimes does, forward the safety messages to a central server such as, e.g., network server 1302. The central server may, and sometimes does, then identify the movement of different vehicles in the vicinity and use the cellular network to push information to the cell phones in the pedestrians and cyclists informing them of the impending vehicles in their neighborhood. Alternately or in addition, in some embodiments, the cell phones can also be, and sometimes are, equipped with DSRC radios to directly receive the safety messages from the vehicles. An exemplary cell phone without a DSRC radio is device 1342. An exemplary cell phone with DSRC capability is device 1322.

One aspect of some embodiments describes how a cell phone may, and sometimes does, receive safety messages from a base station, e.g., a base station which is part of a 3G cellular network. An exemplary base station is base station 1304, which in some embodiments, support 3G cellular communications.

In some embodiments, road-side units and/or vehicles with a backhaul to the network can, and sometimes do, forward safety messages and/or a compressed version of the safety messages to a central server. In some such embodiments, the devices may, and sometimes do, identify an efficient route to the base station or the cellular network.

In various embodiments, the cellular network can, and sometimes does, receive safety messages from one or more entities, e.g., one or more vehicles, one or more roadside units and/or a central server.

The cellular network can, and sometimes does, then send out safety warnings to pedestrians and cyclists over the cellular bandwidth of the cellular network, e.g. 3G. In some embodiments, the pedestrians and/or cyclists may, and sometimes do send out their location information, e.g., GPS information, to a cell tower so that the cellular network can identify the position of the pedestrian/cyclist, in an overall map including roads. The cellular network may, and sometimes does, then estimate if certain vehicles are in path of the pedestrian and send out safety warnings to specific users.

In some embodiments, the cellular network may, and sometimes does, send out a periodic safety message digest that is relevant for a given region through base stations in that region, and the cell phones may then individually predict the trajectories of vehicles and then internally generate a warning.

Other aspects and/or features of some embodiments are further discussed below. In some embodiments, at least some cell phones are equipped with DSRC radios and may listen in the DSRC band. In some embodiments, the DSRC band is a 5.9 GHz band. In some such embodiments, this 5.9 GHz DSRC band is applicable in the US. In some embodiments, cell phones may, and sometimes do, receive periodic broadcast messages from DSRC devices and generate safety warnings if the vehicles are predicted to be in the way for a collision. In some embodiments, such cell phones may, and sometimes do, further forward a section of safety messages back to the cellular network to help with the estimation for other cars.

In various embodiments, a device of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals supporting cellular communications and DSRC communications, access points such as base stations, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as wireless terminals, network nodes, and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a safety system, comprising:
   receiving, at a server in a cellular network, safety message information obtained from dedicated short-range communications (DSRC) signals; and
   transmitting, to mobile cellular network devices which do not have DSRC capability, via a cellular wireless transmitter, cellular network signals communicating at least some of said received safety message information obtained from DSRC signals.

2. The method of claim 1,
   wherein said mobile cellular network devices include telephones which do not have DSRC capability; and
   wherein said at least some safety message information obtained from DSRC signals includes information useful for altering an intended course.

3. The method of claim 1, wherein the at least some safety information indicates a location and path of nearby vehicular traffic.

4. The method of claim 1, wherein receiving at a server in a cellular network, safety message information obtained from dedicated short-range communications signals includes receiving at least some of said safety message information from mobile wireless terminals in said cellular network which receive DSRC signals from vehicles in addition to receiving cellular network signals; and
   wherein the method further comprises:
   receiving from cellular network devices GPS location information in addition to said at least some safety message information obtained from DSRC signals, said location information indicating the location of the devices providing DSRC information.

5. The method of claim 2, wherein transmitting cellular network signals communicating at least some of said received safety message information, to the mobile cellular network devices includes sending a digest report of safety information to the mobile cellular network devices.

6. A safety system, comprising:
   means for receiving, at a server in a cellular network, safety message information obtained from dedicated short-range communications (DSRC) signals; and
   means for transmitting, to mobile cellular network devices which do not have DSRC capability, cellular network signals communicating at least some of said received safety message information obtained from DSRC signals.

7. The safety system of claim 6, wherein said mobile cellular network devices include telephones which do not have DSRC capability.

8. The safety system of claim 6, wherein said means for receiving at a server in a cellular network, safety message information obtained from dedicated short-range communications signals, includes:
   means for receiving at least some of said information from mobile wireless terminals in said cellular network which receive DSRC signals from vehicles in addition to receiving cellular network signals.

9. The safety system of claim 8, further comprising:
   means for receiving from cellular network devices location information in addition to said at least some safety message information obtained from DSRC signals, said location information indicating the location of the devices providing DSRC information.

10. The safety system of claim 8, wherein said means for transmitting cellular network signals communicating at least some of said received safety message information to mobile cellular network devices includes:

means for sending a digest report of safety information to the mobile cellular network devices.

11. A computer program product for use in a safety system, the computer program product comprising:
a non-transitory computer readable medium comprising:
code for causing at least one computer to receive at a server in a cellular network, safety message information obtained from dedicated short-range communications (DSRC) signals; and
code for causing said at least one computer to transmit to mobile cellular network devices which do not have DSRC capability, via a cellular wireless transmitter, cellular network signals communicating at least some of said received safety message information obtained from DSRC signals.

12. A safety system comprising:
at least one processor configured to control said safety system to:
receive at a server in a cellular network, safety message information obtained from dedicated short-range communications (DSRC) signals;
transmit, to mobile cellular network devices which do not have DSRC capability, via a cellular wireless transmitter, cellular network signals communicating at least some of said received safety message information obtained from DSRC signals; and
memory coupled to said at least one processor.

13. The safety system of claim 12, wherein said mobile cellular network devices include telephones which do not have DSRC capability.

14. The safety system of claim 12, wherein said at least one processor is configured to control said safety system to receive at least some of said information from mobile wireless terminals in said cellular network which receive DSRC signals from vehicles in addition to receiving cellular network signals, as part of being configured to receive at a server in a cellular network, safety message information obtained from dedicated short-range communications signals.

15. The safety system of claim 14, wherein said at least one processor is further configured to control said safety system to:
receive from cellular network devices location information in addition to said at least some safety message information obtained from DSRC signals, said location information indicating the location of the devices providing DSRC information.

16. A method of operating a multi-mode wireless communications device which supports cellular and DSRC communications, comprising:
receiving at least one DSRC signal communicating safety message information; and
communicating safety message information obtained from the DSRC signal to a device that operates as a server in a cellular network and which communicates said safety message information via cellular wireless signals to mobile cellular devices which do not have DSRC capability.

17. The method of claim 16, further comprising;
receiving additional DSRC signals from a plurality of different devices;
and wherein said communicating safety message information obtained from the DSRC signal is performed as part of communicating information aggregated from DSRC signals received from multiple different DSRC capable devices.

18. The method of claim 16, further comprising:
receiving additional safety message information from the cellular network;
generating a DSRC message communicating at least some of the received additional safety message information; and
transmitting the generated DSRC message communicating at least some of the received additional safety message information.

19. The method of claim 18, wherein the additional safety message information from the cellular network includes at least one of a safety message digest report corresponding to a geographic region, weather alerts, traffic alerts or construction alerts.

20. The method of claim 19, wherein generating a DSRC message includes:
identifying a subset of the additional safety message information received from the cellular network relevant to the proximate area in which the multimode wireless communications device is located; and
including said subset of the additional safety message information in said generated DSRC message, said DSRC message communicating less than all the additional safety message information received from the cellular network.

21. A multi-mode wireless communications device which supports cellular and DSRC communications, the device comprising:
means for receiving at least one DSRC signal communicating safety message information; and
means for communicating safety message information obtained from the DSRC signal to a device that operates as a server in a cellular network and which communicates said safety message information via cellular wireless signals to mobile cellular devices which do not have DSRC capability.

22. The multi-mode wireless communications device of claim 21, further comprising;
means for receiving additional DSRC signals from a plurality of different devices; and
means for communicating information aggregated from DSRC signals received from multiple different DSRC capable devices.

23. The multi-mode wireless communications device of claim 21, further comprising:
means for receiving additional safety message information from the cellular network;
means for generating a DSRC message communicating at least some of the received additional safety message information; and
means for transmitting the DSRC message communicating at least some of the received additional safety message information.

24. The multi-mode wireless communications device of claim 23, wherein the additional safety message information from the cellular network includes at least one of a safety message digest report corresponding to a geographic region, weather alerts, traffic alerts or construction alerts.

25. The multi-mode wireless communications device of claim 24, wherein said means for generating a DSRC message includes:
means for identifying a subset of the additional safety message information received from the cellular network relevant to the proximate area in which the multimode device is located; and
means for including said subset of the additional safety message information in said generated DSRC message, said DSRC message communicating less than all the additional safety message information received from the cellular network.

26. A computer program product for use in a multi-mode wireless communications device which supports cellular and DSRC communications, the computer program product comprising:
a non-transitory computer readable medium comprising:
code for causing at least one computer to receive at least one DSRC signal communicating safety message information; and
code for causing said at least one computer to communicate safety message information obtained from the DSRC signal to a device that operates as a server in a cellular network and which communicates said safety message information via cellular wireless signals to mobile cellular devices which do not have DSRC capability.

27. A multi-mode wireless communications device which supports cellular and DSRC communications, the device comprising:
at least one processor configured to:
receive at least one DSRC signal communicating safety message information; and
communicate safety message information obtained from the DSRC signal to a device that operates as a server in a cellular network and which communicates said safety message information via cellular wireless signals to mobile cellular devices which do not have DSRC capability; and
memory coupled to said at least one processor.

28. The multi-mode wireless communications device of claim 27, wherein said at least one processor is further configured to:
receive additional DSRC signals from a plurality of different devices; and
communicate information aggregated from DSRC signals received from multiple different DSRC capable devices.

29. The multi-mode wireless communications device of claim 27, wherein said at least one processor is further configured to:
receive additional safety message information from the cellular network;
generate a DSRC message communicating at least some of the received additional safety message information; and
transmit the DSRC message communicating at least some of the received additional safety message information.

30. The multi-mode wireless communications device of claim 29, wherein the additional safety message information from the cellular network includes at least one of a safety message digest report corresponding to a geographic region, weather alerts, traffic alerts or construction alerts.

* * * * *